(12) United States Patent
Taylor et al.

(10) Patent No.: US 8,379,841 B2
(45) Date of Patent: Feb. 19, 2013

(54) METHOD AND SYSTEM FOR HIGH THROUGHPUT BLOCKWISE INDEPENDENT ENCRYPTION/DECRYPTION

(75) Inventors: David E. Taylor, St. Louis, MO (US); Ronald S. Indeck, St. Louis, MO (US); Jason R. White, Manchester, MO (US); Roger D. Chamberlain, St. Louis, MO (US)

(73) Assignee: Exegy Incorporated, St. Louis, MO (US)

( * ) Notice: Subject to any disclaimer, the term of this patent is extended or adjusted under 35 U.S.C. 154(b) by 1245 days.

(21) Appl. No.: 11/690,034

(22) Filed: Mar. 22, 2007

(65) Prior Publication Data
US 2007/0237327 A1 Oct. 11, 2007

Related U.S. Application Data

(60) Provisional application No. 60/785,821, filed on Mar. 23, 2006.

(51) Int. Cl.
*G06F 21/00* (2006.01)
(52) U.S. Cl. ................. 380/28; 380/37; 380/29
(58) Field of Classification Search .............. None
See application file for complete search history.

(56) References Cited

U.S. PATENT DOCUMENTS

| | | | |
|---|---|---|---|
| 5,243,655 A | 9/1993 | Wang | |
| 5,249,292 A | 9/1993 | Chiappa | |
| 5,371,794 A | 12/1994 | Diffie et al. | |
| 5,432,822 A | 7/1995 | Kaewell, Jr. | |
| 5,461,712 A | 10/1995 | Chelstowski et al. | |
| 5,481,735 A | 1/1996 | Mortensen et al. | |
| 5,619,574 A | 4/1997 | Johnson et al. | |
| 5,701,464 A | 12/1997 | Aucsmith | |
| 5,704,060 A | 12/1997 | Del Monte | |
| 5,805,832 A | 9/1998 | Brown et al. | |
| 5,813,000 A | 9/1998 | Furlani | |
| 5,943,421 A | 8/1999 | Grabon | |
| 5,991,881 A | 11/1999 | Conklin et al. | |
| 6,023,760 A | 2/2000 | Karttunen | |
| 6,028,939 A | 2/2000 | Yin | |
| 6,044,375 A | 3/2000 | Shmueli et al. | |
| 6,044,407 A | 3/2000 | Jones et al. | |

(Continued)

FOREIGN PATENT DOCUMENTS

| | | |
|---|---|---|
| EP | 0880088 | 11/1996 |
| EP | 0851358 A | 7/1998 |

(Continued)

OTHER PUBLICATIONS

"RFC793: Transmission Control Protocol, Darpa Internet Program, Protocol Specification", Sep. 1981.

(Continued)

*Primary Examiner* — Nathan Flynn
*Assistant Examiner* — Michael R Vaughan
(74) *Attorney, Agent, or Firm* — Thompson Coburn LLP

(57) ABSTRACT

An encryption technique is disclosed for encrypting a data segment comprising a plurality of data blocks, wherein the security and throughput of the encryption is enhanced by using blockwise independent bit vectors for reversible combination with the data blocks prior to key encryption. Preferably, the blockwise independent bit vectors are derived from a data tag associated with the data segment. Several embodiments are disclosed for generating these blockwise independent bit vectors. In a preferred embodiment, the data tag comprises a logical block address (LBA) for the data segment. Also disclosed herein is a corresponding decryption technique as well as a corresponding symmetrical encryption/decryption technique.

57 Claims, 17 Drawing Sheets

BIR + CBC Encryption

U.S. PATENT DOCUMENTS

| | | | |
|---|---|---|---|
| 6,064,739 A | 5/2000 | Davis | |
| 6,067,569 A | 5/2000 | Khaki et al. | |
| 6,073,160 A | 6/2000 | Grantham et al. | |
| 6,084,584 A | 7/2000 | Nahi et al. | |
| 6,105,067 A | 8/2000 | Batra | |
| 6,134,551 A | 10/2000 | Aucsmith | |
| RE36,946 E | 11/2000 | Diffie et al. | |
| 6,147,890 A | 11/2000 | Kawana et al. | |
| 6,147,976 A | 11/2000 | Shand et al. | |
| 6,169,969 B1 | 1/2001 | Cohen | |
| 6,185,531 B1 | 2/2001 | Schwartz et al. | |
| 6,195,024 B1 | 2/2001 | Fallon | |
| 6,226,676 B1 | 5/2001 | Crump et al. | |
| 6,279,113 B1 | 8/2001 | Vaidya | |
| 6,307,936 B1 | 10/2001 | Ober et al. | |
| 6,309,424 B1 | 10/2001 | Fallon | |
| 6,317,795 B1 | 11/2001 | Malkin et al. | |
| 6,377,942 B1 | 4/2002 | Hinsley et al. | |
| 6,397,259 B1 | 5/2002 | Lincke et al. | |
| 6,397,335 B1 | 5/2002 | Franczek et al. | |
| 6,412,000 B1 | 6/2002 | Riddle et al. | |
| 6,430,272 B1 | 8/2002 | Maruyama et al. | |
| 6,442,545 B1 | 8/2002 | Feldman et al. | |
| 6,463,474 B1 | 10/2002 | Fuh et al. | |
| 6,499,107 B1 | 12/2002 | Gleichauf et al. | |
| 6,578,147 B1 | 6/2003 | Shanklin et al. | |
| 6,597,812 B1 | 7/2003 | Fallon et al. | |
| 6,601,104 B1 | 7/2003 | Fallon | |
| 6,604,158 B1 | 8/2003 | Fallon | |
| 6,624,761 B2 | 9/2003 | Fallon | |
| 6,625,150 B1 | 9/2003 | Yu | |
| 6,633,868 B1 | 10/2003 | Min et al. | |
| 6,658,377 B1 | 12/2003 | Anward et al. | |
| 6,658,423 B1 | 12/2003 | Pugh et al. | |
| 6,704,816 B1 | 3/2004 | Burke | |
| 6,711,558 B1 | 3/2004 | Indeck et al. | |
| 6,760,439 B1 | 7/2004 | Windirsch | |
| 6,765,918 B1 | 7/2004 | Dixon et al. | |
| 6,772,170 B2 | 8/2004 | Pennock et al. | |
| 6,772,345 B1 | 8/2004 | Shetty | |
| 6,782,394 B1 | 8/2004 | Landeck et al. | |
| 6,804,667 B1 | 10/2004 | Martin | |
| 6,807,156 B1 | 10/2004 | Veres et al. | |
| 6,870,929 B1* | 3/2005 | Greene | 380/28 |
| 6,882,747 B2 | 4/2005 | Thawonmas et al. | |
| 6,886,103 B1 | 4/2005 | Brustoloni et al. | |
| 6,931,545 B1 | 8/2005 | Ta et al. | |
| 6,941,312 B1 | 9/2005 | Hoffman et al. | |
| 6,944,168 B2 | 9/2005 | Paatela et al. | |
| 6,971,017 B2 | 11/2005 | Stringer et al. | |
| 6,978,223 B2 | 12/2005 | Milliken | |
| 6,981,054 B1 | 12/2005 | Krishna | |
| 7,016,910 B2 | 3/2006 | Egilsson et al. | |
| 7,016,914 B2 | 3/2006 | Nayak | |
| 7,024,408 B2 | 4/2006 | Dehlinger et al. | |
| 7,028,250 B2 | 4/2006 | Ukrainczyk et al. | |
| 7,051,037 B1 | 5/2006 | Thomas et al. | |
| 7,054,854 B1 | 5/2006 | Hattori et al. | |
| 7,082,427 B1 | 7/2006 | Seibel et al. | |
| 7,089,188 B2 | 8/2006 | Logan et al. | |
| 7,092,956 B2 | 8/2006 | Ruediger | |
| 7,093,023 B2 | 8/2006 | Lockwood et al. | |
| 7,096,179 B2 | 8/2006 | Zhu et al. | |
| 7,106,905 B2 | 9/2006 | Simske | |
| 7,113,954 B2 | 9/2006 | Vogel | |
| 7,117,437 B2 | 10/2006 | Chen et al. | |
| 7,120,079 B2 | 10/2006 | McCollum et al. | |
| 7,120,699 B2 | 10/2006 | Stork et al. | |
| 7,124,140 B2 | 10/2006 | Barton | |
| 7,130,913 B2 | 10/2006 | Fallon | |
| 7,139,743 B2 | 11/2006 | Indeck et al. | |
| 7,161,506 B2 | 1/2007 | Fallon | |
| 7,167,980 B2 | 1/2007 | Chiu | |
| 7,181,437 B2 | 2/2007 | Indeck et al. | |
| 7,181,608 B2 | 2/2007 | Fallon et al. | |
| 7,222,114 B1 | 5/2007 | Chan | |
| 7,321,937 B2 | 1/2008 | Fallon | |
| 7,353,267 B1 | 4/2008 | Cunningham et al. | |
| 7,362,859 B1* | 4/2008 | Robertson et al. | 380/37 |
| 7,378,992 B2 | 5/2008 | Fallon | |
| 7,386,046 B2 | 6/2008 | Fallon et al. | |
| 7,411,957 B2 | 8/2008 | Stacy et al. | |
| 7,417,568 B2 | 8/2008 | Fallon et al. | |
| 7,444,515 B2 | 10/2008 | Dharmapurikar et al. | |
| 7,552,107 B2 | 6/2009 | Indeck et al. | |
| 7,558,925 B2 | 7/2009 | Bouchard et al. | |
| 7,570,760 B1 | 8/2009 | Olson et al. | |
| 7,580,719 B2* | 8/2009 | Karmarkar | 455/466 |
| 7,620,821 B1 | 11/2009 | Grohoski et al. | |
| 7,623,660 B1* | 11/2009 | Cory | 380/200 |
| 7,636,703 B2 | 12/2009 | Taylor | |
| 7,660,793 B2 | 2/2010 | Indeck et al. | |
| 7,680,790 B2 | 3/2010 | Indeck et al. | |
| 7,702,629 B2 | 4/2010 | Cytron et al. | |
| 7,714,747 B2 | 5/2010 | Fallon | |
| 7,885,405 B1 | 2/2011 | Bong | |
| 7,949,650 B2 | 5/2011 | Indeck et al. | |
| 7,953,743 B2 | 5/2011 | Indeck et al. | |
| 7,954,114 B2 | 5/2011 | Chamberlain et al. | |
| 8,069,102 B2 | 11/2011 | Indeck et al. | |
| 8,095,508 B2 | 1/2012 | Chamberlain et al. | |
| 8,131,697 B2 | 3/2012 | Indeck et al. | |
| 8,155,308 B1 | 4/2012 | Poo et al. | |
| 2001/0007127 A1 | 7/2001 | Staring | |
| 2001/0033656 A1* | 10/2001 | Gligor et al. | 380/28 |
| 2001/0047473 A1 | 11/2001 | Fallon | |
| 2001/0052038 A1 | 12/2001 | Fallon et al. | |
| 2001/0056547 A1 | 12/2001 | Dixon | |
| 2002/0006196 A1 | 1/2002 | Shimoyama et al. | |
| 2002/0016773 A1 | 2/2002 | Ohkuma et al. | |
| 2002/0021802 A1 | 2/2002 | Muratani et al. | |
| 2002/0023010 A1 | 2/2002 | Rittmaster et al. | |
| 2002/0041685 A1 | 4/2002 | McLoone et al. | |
| 2002/0080871 A1 | 6/2002 | Fallon et al. | |
| 2002/0103663 A1 | 8/2002 | Bankier et al. | |
| 2002/0105911 A1 | 8/2002 | Pruthi et al. | |
| 2002/0106078 A1* | 8/2002 | Qi et al. | 380/29 |
| 2002/0112167 A1* | 8/2002 | Boneh et al. | 713/182 |
| 2002/0116508 A1 | 8/2002 | Khan et al. | |
| 2002/0129140 A1 | 9/2002 | Peled et al. | |
| 2002/0150248 A1 | 10/2002 | Kovacevic | |
| 2002/0162025 A1 | 10/2002 | Sutton et al. | |
| 2002/0166063 A1 | 11/2002 | Lachman et al. | |
| 2002/0169873 A1 | 11/2002 | Zodnik | |
| 2002/0181709 A1* | 12/2002 | Sorimachi et al. | 380/265 |
| 2002/0191784 A1 | 12/2002 | Yup et al. | |
| 2003/0009693 A1 | 1/2003 | Brock et al. | |
| 2003/0014521 A1 | 1/2003 | Elson et al. | |
| 2003/0014662 A1 | 1/2003 | Gupta et al. | |
| 2003/0018630 A1 | 1/2003 | Indeck et al. | |
| 2003/0023876 A1 | 1/2003 | Bardsley et al. | |
| 2003/0035547 A1 | 2/2003 | Newton | |
| 2003/0039355 A1 | 2/2003 | McCanny et al. | |
| 2003/0043805 A1 | 3/2003 | Graham et al. | |
| 2003/0051043 A1 | 3/2003 | Wyschogrod et al. | |
| 2003/0059054 A1 | 3/2003 | Hu et al. | |
| 2003/0065943 A1 | 4/2003 | Geis et al. | |
| 2003/0068036 A1 | 4/2003 | Macchetti et al. | |
| 2003/0074582 A1 | 4/2003 | Patel et al. | |
| 2003/0090397 A1 | 5/2003 | Rasmussen | |
| 2003/0099352 A1 | 5/2003 | Lu et al. | |
| 2003/0108195 A1 | 6/2003 | Okada et al. | |
| 2003/0110229 A1 | 6/2003 | Kulig et al. | |
| 2003/0115485 A1 | 6/2003 | Milliken | |
| 2003/0149869 A1 | 8/2003 | Gleichauf | |
| 2003/0163715 A1 | 8/2003 | Wong | |
| 2003/0169877 A1 | 9/2003 | Liu et al. | |
| 2003/0177253 A1 | 9/2003 | Schuehler et al. | |
| 2003/0191876 A1 | 10/2003 | Fallon | |
| 2003/0198345 A1 | 10/2003 | Van Buer | |
| 2003/0221013 A1 | 11/2003 | Lockwood et al. | |
| 2004/0028047 A1 | 2/2004 | Hou et al. | |
| 2004/0049596 A1 | 3/2004 | Schuehler et al. | |
| 2004/0064737 A1 | 4/2004 | Milliken et al. | |
| 2004/0117645 A1 | 6/2004 | Okuda et al. | |
| 2004/0146164 A1 | 7/2004 | Jonas et al. | |
| 2004/0165721 A1 | 8/2004 | Sano et al. | |

| | | | |
|---|---|---|---|
| 2004/0196905 A1 | 10/2004 | Yamane et al. | |
| 2004/0205149 A1 | 10/2004 | Dillon et al. | |
| 2004/0208318 A1 | 10/2004 | Henry et al. | |
| 2004/0218762 A1 | 11/2004 | Le Saint et al. | |
| 2004/0228479 A1 | 11/2004 | Crispin et al. | |
| 2004/0255130 A1 | 12/2004 | Henry et al. | |
| 2005/0005145 A1 | 1/2005 | Teixeira | |
| 2005/0086520 A1 | 4/2005 | Dharmapurikar et al. | |
| 2005/0094805 A1* | 5/2005 | Kitani et al. | 380/28 |
| 2005/0135607 A1 | 6/2005 | Lee et al. | |
| 2005/0135608 A1 | 6/2005 | Zheng | |
| 2005/0175175 A1 | 8/2005 | Leech | |
| 2005/0195832 A1 | 9/2005 | Dharmapurikar et al. | |
| 2005/0207571 A1 | 9/2005 | Ahn et al. | |
| 2005/0229254 A1 | 10/2005 | Singh et al. | |
| 2005/0286720 A1* | 12/2005 | Fukuoka et al. | 380/255 |
| 2006/0053295 A1 | 3/2006 | Madhusudan et al. | |
| 2006/0059213 A1 | 3/2006 | Evoy | |
| 2006/0072746 A1 | 4/2006 | Tadepalli | |
| 2006/0101005 A1 | 5/2006 | Yang et al. | |
| 2006/0129745 A1 | 6/2006 | Thiel et al. | |
| 2006/0147040 A1 | 7/2006 | Lee et al. | |
| 2006/0269148 A1 | 11/2006 | Farber et al. | |
| 2006/0294059 A1 | 12/2006 | Chamberlain et al. | |
| 2007/0061594 A1 | 3/2007 | Ginter et al. | |
| 2007/0067108 A1 | 3/2007 | Buhler et al. | |
| 2007/0074047 A1 | 3/2007 | Metzger et al. | |
| 2007/0078837 A1 | 4/2007 | Indeck et al. | |
| 2007/0118500 A1 | 5/2007 | Indeck et al. | |
| 2007/0130140 A1 | 6/2007 | Cytron et al. | |
| 2007/0174841 A1 | 7/2007 | Chamberlain et al. | |
| 2007/0183594 A1* | 8/2007 | Russell | 380/28 |
| 2007/0260602 A1 | 11/2007 | Taylor | |
| 2007/0277036 A1 | 11/2007 | Chamberlain et al. | |
| 2007/0286415 A1 | 12/2007 | Bertoni et al. | |
| 2007/0297608 A1 | 12/2007 | Jonas et al. | |
| 2008/0086274 A1 | 4/2008 | Chamberlain et al. | |
| 2008/0109413 A1 | 5/2008 | Indeck et al. | |
| 2008/0114724 A1 | 5/2008 | Indeck et al. | |
| 2008/0114725 A1 | 5/2008 | Indeck et al. | |
| 2008/0114760 A1 | 5/2008 | Indeck et al. | |
| 2008/0126320 A1 | 5/2008 | Indeck et al. | |
| 2008/0133453 A1 | 6/2008 | Indeck et al. | |
| 2008/0133519 A1 | 6/2008 | Indeck et al. | |
| 2008/0189251 A1 | 8/2008 | Branscome et al. | |
| 2008/0243675 A1 | 10/2008 | Parsons et al. | |
| 2008/0260158 A1* | 10/2008 | Chin et al. | 380/277 |
| 2009/0060197 A1 | 3/2009 | Taylor et al. | |
| 2009/0287628 A1 | 11/2009 | Indeck et al. | |
| 2010/0094858 A1 | 4/2010 | Indeck et al. | |
| 2010/0198850 A1 | 8/2010 | Cytron et al. | |
| 2011/0199243 A1 | 8/2011 | Fallon et al. | |
| 2011/0231446 A1 | 9/2011 | Buhler et al. | |
| 2011/0252008 A1 | 10/2011 | Chamberlain et al. | |
| 2012/0109849 A1 | 5/2012 | Chamberlain et al. | |
| 2012/0110316 A1 | 5/2012 | Chamberlain et al. | |

FOREIGN PATENT DOCUMENTS

| | | |
|---|---|---|
| EP | 0887723 | 12/1998 |
| EP | 0911738 A | 4/1999 |
| JP | 2000286715 A | 10/2000 |
| JP | 2001268071 A | 9/2001 |
| JP | 2001285283 A | 10/2001 |
| JP | 2001518724 | 10/2001 |
| JP | 2001357048 A | 12/2001 |
| JP | 2002101089 A | 4/2002 |
| JP | 2002108910 A | 4/2002 |
| JP | 2003122442 A | 4/2003 |
| JP | 2005242997 A | 9/2005 |
| WO | 9409443 A1 | 4/1994 |
| WO | 9905814 | 2/1999 |
| WO | 9955052 | 10/1999 |
| WO | 0041136 A1 | 7/2000 |
| WO | 0122425 A | 3/2001 |
| WO | 0161913 | 8/2001 |
| WO | 0180558 | 10/2001 |
| WO | 02061525 | 8/2002 |
| WO | 03100650 | 4/2003 |
| WO | 03036845 | 5/2003 |
| WO | 2004017604 | 2/2004 |
| WO | 2004042560 A | 5/2004 |
| WO | 2004042561 A | 5/2004 |
| WO | 2004042562 | 5/2004 |
| WO | 2004042574 A | 5/2004 |
| WO | 2005017708 | 2/2005 |
| WO | 2005026925 | 3/2005 |
| WO | 2005048134 A | 5/2005 |
| WO | 2006023948 | 3/2006 |
| WO | 2007087507 | 8/2007 |
| WO | 2009029842 | 3/2009 |

OTHER PUBLICATIONS

Anerousis et al., "Using the AT&T Labs PacketScope for Internet Measurement, Design, and Performance Analysis", Network and Distributed Systems Research Laboratory, AT&T Labs-Research, Florham, Park, NJ, Oct. 1997.

Artan et al., "Multi-packet Signature Detection using Prefix Bloom Filters", 2005, IEEE, pp. 1811-1816.

Baboescu et al., "Scalable Packet Classification".

Bloom, "Space/Time Trade-offs in Hash Coding With Allowable Errors", Communications of the ACM, Jul. 1970, pp. 422-426, vol. 13, No. 7, Computer Usage Company, Newton Upper Falls, Massachusetts, USA.

Chaney et al., "Design of a Gigabit ATM Switch", Washington University, St. Louis.

Cuppu and Jacob, "Organizational Design Trade-Offs at the DRAM, Memory Bus and Memory Controller Level: Initial Results," Technical Report UMB-SCA-1999-2, Univ. of Maryland Systems & Computer Architecture Group, Nov. 1999, pp. 1-10.

Dharmapurikar et al., "Deep Packet Inspection Using Parallel Bloom Filters," Symposium on High Performance Interconnects (HotI), Stanford, California, 2003, pp. 44-51.

Dharmapurikar et al., "Longest Prefix Matching Using Bloom Filters," SIGCOMM, 2003, pp. 201-212.

Dharmapurikar et al., "Robust TCP Stream Reassembly in the Presence of Adversaries", Proc. of the 14th Conference on USENIX Security Symposium—vol. 14, 16 pages, Baltimore, MD, 2005; http://www.icir.org/vern/papers/TcpReassembly/TCPReassembly.pdf.

Feldmann, "BLT: Bi-Layer Tracing of HTTP and TCP/IP", AT&T Labs-Research, Florham Park, NJ, USA.

Gupta et al., "Packet Classification on Multiple Fields", Computer Systems Laboratory, Stanford University, Stanford, CA.

Gurtov, "Effect of Delays on TCP Performance", Cellular Systems Development, Sonera Corporation.

International Search Report for PCT/US2002/033286; Jan. 22, 2003.
International Search Report for PCT/US2005/030046; Sep. 25, 2006.

Jacobson et al., "RFC 1072: TCP Extensions for Long-Delay Paths", Oct. 1988.

Jacobson et al., "tcpdump—dump traffic on a network".

Johnson et al., "Pattern Matching in Reconfigurable Logic for Packet Classification", College of Computing, Georgia Institute of Technology, Atlanta, GA.

Madhusudan, "Design of a System for Real-Time Worm Detection", Hot Interconnects, pp. 77-83, Stanford, CA, Aug. 2004, found at http://www.hoti.org/hoti12/program/papers/20041paper4.2.pdf.

Madhusudan, "Design of a System for Real-Time Worm Detection", Master's Thesis, Washington Univ., Dept. of Computer Science and Engineering, St. Louis, MO, Aug. 2004.

Madhusudan, "Design of a System for Real-Time Worm Detection", Power Point Presentation in Support of Master's Thesis, Washington Univ., Dept. of Computer Science and Engineering, St. Louis, MO, Aug. 2004.

Mao et al., "Cluster-based Online Monitoring System of Web Traffic", Dept. of Computer Science and Technology, Tsinghua Univ., Bejing, 100084 P.R. China.

Moscola et al., "FPSed: A Streaming Content Search-And-Replace Module for an Internet Firewall", Proc. of Hot Interconnects, 11th Symposium on High Performance Interconnects, pp. 122-129, Aug. 20, 2003.

Moscola, "FPGrep and FPSed: Packet Payload Processors for Managing the Flow of Digital Content on Local Area Networks and the Internet", Master's Thesis, Sever Institute of Technology, Washington University, St. Louis, MO, Aug. 2003.

Necker et al., "TCP-Stream Reassembly and State Tracking in Hardware", School of Electrical and Computer Engineering, Georgia Institute of Technology, Atlanta, GA.

Prakash et al., "OC-3072 Packet Classification Using BDDs and Pipelined SRAMs", Department of Electrical and Computer Engineering, The University of Texas at Austin.

Roberts, "Internet Still Growing Dramatically Says Internet Founder", Press Release, Caspian Networks, Inc.—Virtual Pressroom.

Schuehler et al., "Architecture for a Hardware Based, TCP/IP Content Scanning System", IEEE Micro, 24(1):62-69, Jan.-Feb. 2004, USA.

Schuehler et al., "TCP-Splitter: A TCP/IP Flow Monitor in Reconfigurable Hardware", Hot Interconnects 10 (HotI-10), Stanford, CA, Aug. 21-23, 2002, pp. 127-131.

Shalunov et al., "Bulk TCP Use and Performance on Internet 2".

Singh et al., "The EarlyBird System for Real-Time Detection on Unknown Worms", Technical report CS2003-0761, Aug. 2003.

Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc.gatech.edu/classes/AY2007/cs8803hpc_fall/papers/phplugins.pdf.

Waldvogel et al., "Scalable High-Speed Prefix Matching".

Weaver et al., "Very Fast Containment of Scanning Worms", Proc. USENIX Security Symposium 2004, San Diego, CA, Aug. 2004, located at http://www.icsi.berkely.edu/~nweaver/containment/containment.pdf.

Wooster et al., "HTTPDUMP Network HTTP Packet Snooper", Apr. 25, 1996.

Yan et al., "Enhancing Collaborative Spam Detection with Bloom Filters", 2006, IEEE, pp. 414-425.

"Lucent Technologies Delivers "PayloadPlus" Network Processors for Programmable, MultiProtocol, OC-48c Processing", Lucent Technologies Press Release, downloaded from http://www.lucent.com/press/1000/0010320.meb.html on Mar. 21, 2002.

"Overview, Field Programmable Port Extender", Jan. 2002 Gigabit Workshop Tutorial, Washington University, St. Louis, MO, Jan. 3-4, 2002, pp. 1-4.

"Payload PlusO Agere System Interface", Agere Systems Product Brief, Jun. 2001, downloaded from Internet, Jan. 2002, pp. 1-6.

"Technology Overview", Data Search Systems Incorporated, downloaded from the http://www.datasearchsystems.com/tech.htm on Apr. 19, 2004.

"The Field-Programmable Port Extender (FPX)", downloaded from http://www.arl.wustl.edu/arl/ in Mar. 2002.

Aldwairi et al., "Configurable String Matching Hardware for Speeding up Intrusion Detection", SIRARCH Comput. Archit. News, vol. 33, No. 1, pp. 99-107, Mar. 2005.

Amanuma et al., "A FPGA Architecture for High Speed Computation", Proceedings of 60th Convention Architecture, Software Science, Engineering, Mar. 14, 2000, pp. 1-163-1-164, Information Processing Society, Japan.

Amer-Yahia et al., "XQuery 1.0 and XPath 2.0 Full-Text 1.0", W3C Working Draft, http://www.w3.org/TR/query-full-text/, May 18, 2007 (parts 1-4).

ANSI X9.52/1998, "Triple Data Encryption Algorithm Modes of Operation", American National Standards Institute, Approved: Jul. 29, 1998.

Arnold et al., "The Splash 2 Processor and Applications", Proceedings 1993 IEEE International Conference on Computer Design: VLSI in Computers and Processors (ICCD '93), Oct. 3, 1993, pp. 482-485, IEEE Computer Society, Cambridge, MA USA.

Asami et al., "Improvement of DES Key Search on FPGA-Based Parallel Machine "RASH"", Proceedings of Information Processing Society, Aug. 15, 2000, pp. 50-57, vol. 41, No. SIG5 (HPS1), Japan.

Baeza-Yates et al., "New and Faster Filters for Multiple Approximate String Matching", Random Structures and Algorithms (RSA), Jan. 2002, pp. 23-49, vol. 20, No. 1.

Baker et al., "High-throughput Linked-Pattern Matching for Intrusion Detection Systems", ANCS 2005: Proceedings of the 2005 Symposium on Architecture for Networking and Communications Systems, pp. 193-202, ACM Press, 2005.

Braun et al., "Layered Protocol Wrappers for Internet Packet Processing in Reconfigurable Hardware", Proceedings of Hot Interconnects 9 (HotI-9) Stanford, CA, Aug. 22-24, 2001, pp. 93-98.

Braun et al., "Protocol Wrappers for Layered Network Packet Processing in Reconfigurable Hardware", IEEE Micro, Jan.-Feb. 2002, pp. 66-74.

Chamberlain et al., "Achieving Real Data Throughput for an FPGA Co-Processor on Commodity Server Platforms", Proc. of 1st Workshop on Building Block Engine Architectures for Computers and Networks, Oct. 2004, Boston, MA.

Chamberlain et al., "The Mercury System: Embedding Computation Into Disk Drives", 7th High Performance Embedded Computing Workshop, Sep. 2003, Boston, MA.

Chamberlain et al., "The Mercury System: Exploiting Truly Fast Hardware for Data Search", Proc. of Workshop on Storage Network Architecture and Parallel I/Os, Sep. 2003, New Orleans, LA.

Cho et al., "Deep Packet Filter with Dedicated Logic and Read Only Memories", 12th Annual IEEE Symposium on Field-Programmable Custom Computing Machines, Apr. 2004.

Chodowiec et al., "Fast Implementations of Secret-Key Block Ciphers Using Mixed Inter- and Outer-Round Pipelining", Proceedings of International Symposium on FPGAs, pp. 94-102 (Feb. 2001).

Choi et al., "Design of a Flexible Open Platform for High Performance Active Networks", Allerton Conference, 1999, Champaign, IL.

Clark et al., "Scalable Pattern Matching for High Speed Networks", Proceedings of the 12th Annual IEEE Symposium on Field-Programmable Custom Computing Machines, 2004; FCCM 2004, Apr. 20-23, 2004; pp. 249-257; IEEE Computer Society; Cambridge, MA USA.

Cloutier et al., "VIP: An FPGA-Based Processor for Image Processing and Neural Networks", Proceedings of Fifth International Conference on Microelectronics for Neural Networks, Feb. 12, 1996, pp. 330-336, Los Alamitos, California.

Compton et al., "Configurable Computing: A Survey of Systems and Software", Technical Report, Northwestern University, Dept. of ECE, 1999.

Compton et al., "Reconfigurable Computing: A Survey of Systems and Software", Technical Report, Northwestern University, Dept. of ECE, 1999, presented by Yi-Gang Tai.

Department of Computer Science & Engineering; "Technical Reports"; Publication (http://cse.seas.wustl.edu/Research/Publications.asp); Dec. 17, 2007; pp. 1-26; Washington University in St. Louis.

Dharmapurikar et al., "Deep Packet Inspection Using Parallel Bloom Filters," Symposium on High Performance Interconnects (HotI), Stanford, California, 2003, pp. 44-51.

Dharmapurikar et al., "Design and Implementation of a String Matching System for Network Intrusion Detection using FPGA-based Bloom Filters", Proc. of 12th Annual IEEE Symposium on Field Programmable Custom Computing Machines, 2004, pp. 1-10.

Dharmapurikar, "Fast and Scalable Pattern Matching for Content Filtering", ACM, ANCS 05, 2005, pp. 183-192.

Ebeling et al., "RaPiD—Reconfigurable Pipelined Datapath", University of Washington, Dept. of Computer Science and Engineering, Sep. 23, 1996, Seattle, WA.

FIPS 197, "Advanced Encryption Standard", National Institute of Standards and Technology (2001).

FIPS 46-2, "Data Encryption Standard", revised version issued as FIPS 46-3, National Institute of Standards Technology, Dec. 30, 1993.

FIPS Pub. 46-3. Data Encryption Standard (DES). Revised version of 46-2. Reaffirmed Oct. 25, 1999.

Franklin et al., "An Architecture for Fast Processing of Large Unstructured Data Sets." Proc. of 22nd Int'l Conf. on Computer Design, Oct. 2004, pp. 280-287.

Franklin et al., "Assisting Network Intrusion Detection with Reconfigurable Hardware", Symposium on Field-Programmable Custom Computing Machines (FCCM 2002), Apr. 2002, Napa, California.

Fu et al., "The FPX KCPSM Module: An Embedded, Reconfigurable Active Processing Module for the Field Programmable Port Extender (FPX)", Washington University, Department of Computer Science, Technical Report WUCS-01-14, Jul. 2001.

Hauck et al., "Software Technologies for Reconfigurable Systems", Northwestern University, Dept. of ECE, Technical Report, 1996.

Herbordt et al., "Single Pass, BLAST-Like, Approximate String Matching on FPGAs", 14th Annual IEEE Symposium on Field-Programmable Custom Computing Machines (FCCM'06), Apr. 2006, pp. 1-10, IEEE.

Hollaar, "Hardware Systems for Text Information Retrieval", Proceedings of the Sixth Annual International ACM Sigir Conference on Research and Development in Information Retrieval, Jun. 6-8, 1983, pp. 3-9, Baltimore, Maryland, USA.

Lockwood, "Evolvable Internet Hardware Platforms", NASA/DoD Workshop on Evolvable Hardware (EHW'01), Long Beach, CA, Jul. 12-14, 2001, pp. 271-279.

Lockwood, "Hardware Laboratory Configuration", Field Programmable Port Extender: Jan. 2002 Gigabit Workshop Tutorial, Washington University, St. Louis, MO, Jan. 3-4, 2002.

Lockwood, "Introduction", Field Programmable Port Extender: Jan. 2002 Gigabit Workshop Tutorial, Washington University, St. Louis, MO, Jan. 3-4, 2002.

Lockwood, "Platform and Methodology for Teaching Design of Hardware Modules in Internet Routers and Firewalls", IEEE Computer Society International Conference on Microelectronic Systems Education (MSE'2001), Las Vegas, NV, Jun. 17-18, 2001, pp. 56-57.

Lockwood, "Protocol Processing on the FPX", Field Programmable Port Extender: Jan. 2002 Gigabit Workshop Tutorial, Washington University, St. Louis, MO, Jan. 3-4, 2002.

Lockwood, "Simulation and Synthesis", Field Programmable Port Extender: Jan. 2002 Gigabit Workshop Tutorial, Washington University, St. Louis, MO, Jan. 3-4, 2002.

Lockwood, "Simulation of the Hello World Application for the Field-Programmable Port Extender (FPX)", Washington University, Applied Research Lab, Spring 2001 Gigabits Kits Workshop.

Mosanya et al., "A FPGA-Based Hardware Implementation of Generalized Profile Search Using Online Arithmetic", ACM/Sigda International Symposium on Field Programmable Gate Arrays (FPGA '99), Feb. 21-23, 1999, pp. 101-111, Monterey, CA, USA.

Moscola et al., "FPGrep and FPSed: Regular Expression Search and Substitution for Packet Streaming in Field Programmable Hardware", Dept. of Computer Science, Applied Research Lab, Washington University, Jan. 8, 2002, unpublished, pp. 1-19, St. Louis, MO.

Navarro, "A Guided Tour to Approximate String Matching", ACM Computing Surveys, vol. 33, No. 1, Mar. 2001, pp. 31-88.

Nunez et al, "The X-MatchLITE FPGA-Based Data Compressor", Euromicro Conference 1999, Proceedings, Italy, Sep. 8-10, 1999, pp. 126-132, Los Alamitos, CA.

Nwodoh et al., "A Processing System for Real-Time Holographic Video Computation", Reconfigurable Technology: FPGAs for Computing and Application, Proceedings for the SPIE, Sep. 1999, Boston, pp. 129-140, vol. 3844.

Pirsch et al., "VLSI Architectures for Video Compression-A Survey", Proceedings of the IEEE, Feb. 1995, pp. 220-243, vol. 83, No. 2, Institute of Electrical and Electronics Engineers, Washington, DC, USA.

Pramanik et al., "A Hardware Pattern Matching Algorithm on a Dataflow"; Computer Journal; Jul. 1, 1985; pp. 264-269; vol. 28, No. 3; Oxford University Press, Surrey, Great Britain.

Ramakrishna et al., "A Performance Study of Hashing Functions for Hardware Applications", Int. Conf. on Computing and Information, May 1994, pp. 1621-1636, vol. 1, No. 1.

Ramakrishna et al., "Efficient Hardware Hashing Functions for High Performance Computers", IEEE Transactions on Computers, Dec. 1997, vol. 46, No. 12.

Ranganathan et al., "High-Speed VLSI Designs for Lempe-Ziv Based Data Compression", IEEE Transactions on Circuits and Systems-II: Analog and Digital Signal Processing, Feb. 1993, pp. 96-106, vol. 40, No. 2, Institute of Electrical and Electronics Engineers, Washington, DC, USA.

Ratha et al., "Convolution on Splash 2", Proceedings of IEEE Symposium on FPGAS for Custom Computing Machines, Apr. 19, 1995, pp. 204-213, Los Alamitos, California.

Ratha et al., "FPGA-based coprocessor for text string extraction", IEEE, Sep. 11-13, 2000, pp. 217-221.

Roesch, "Snort-Lightweight Intrusion Detection for Networks", Proceedings of LISA '99: 13th Systems Administration Conference; Nov. 7-12, 1999; pp. 229-238; USENIX Association, Seattle, WA USA.

Roy, "A bounded search algorithm for segmented channel routing for FPGA's and associated channel architecture issues", IEEE, Nov. 11, 1993, pp. 1695-1705, vol. 12.

Schmit, "Incremental Reconfiguration for Pipelined Applications", FPGAs for Custom Computing Machines, Proceedings, The 5th Annual IEEE Symposium, Dept. of ECE, Carnegie Mellon University, Apr. 16-18, 1997, pp. 47-55, Pittsburgh, PA.

Seki et al, "High Speed Computation of Shogi With FPGA", Proceedings of 58th Convention Architecture, Software Science, Engineering, Mar. 9, 1999, pp. 1-133-1-134.

Shah, "Understanding Network Processors", Version 1.0, University of California-Berkeley, Sep. 4, 2001.

Shirazi et al., "Quantitative Analysis of FPGA-based Database Searching", Journal of VLSI Signal Processing Systems for Signal, Image, and Video Technology, May 2001, pp. 85-96, vol. 28, No. 1/2, Kluwer Academic Publishers, Dordrecht, NL.

Sidhu et al., "Fast Regular Expression Matching Using FPGAs", IEEE Symposium on Field Programmable Custom Computing Machines (FCCM 2001), Apr. 2001.

Sidhu et al., "String Matching on Multicontext FPGAs Using Self-Reconfiguration", FPGA '99: Proceedings of the 1999 ACM/SIGDA 7th International Symposium on Field Programmable Gate Arrays, Feb. 1999, pp. 217-226.

Sourdis and Pnevmatikatos, "Fast, Large-Scale String Match for a 10Gbps FPGA-based Network Intrusion Detection System", 13th International Conference on Field Programmable Logic and Applications, 2003.

Tan et al., "A High Throughput String Matching Architecture for Intrusion Detection and Prevention", ISCA 2005: 32nd Annual International Symposium on Computer Architecture, pp. 112-122, 2005.

Taylor et al., "Generalized RAD Module Interface Specification of the Field Programmable Port Extender (FPX) Version 2", Washington University, Department of Computer Science, Technical Report, Jul. 5, 2001, pp. 1-10.

Taylor et al., "Modular Design Techniques for the FPX", Field Programmable Port Extender: Jan. 2002 Gigabit Workshop Tutorial, Washington University, St. Louis, MO, Jan. 3-4, 2002.

Uluski et al., "Characterizing Antivirus Workload Execution", SIGARCH Comput. Archit. News, vol. 33, No. 1, pp. 90-98, Mar. 2005.

Villasenor et al, "Configurable Computing Solutions for Automatic Target Recognition", FPGAS for Custom Computing Machines, 1996, Proceedings, IEEE Symposium on Napa Valley, CA, Apr. 17-19, 1996, pp. 70-79, 1996 IEEE, Napa Valley, CA, Los Alamitos, CA, USA.

Ward et al., "Dynamically Reconfigurable Computing: A Novel Computation Technology with Potential to Improve National Security Capabilities", May 15, 2003, A White Paper Prepared by Star Bridge Systems, Inc. [retrieved Dec. 12, 2006]. Retrieved from the Internet: <URL: http://www.starbridgesystems.com/resources/whitepapers/Dynamically%20Reconfigurable%20Computing.pdf.

West et al., "An FPGA-Based Search Engine for Unstructured Database", Proc. of 2nd Workshop on Application Specific Processors, Dec. 2003, San Diego, CA.

Yamaguchi et al., "High Speed Homology Search with FPGAs", Proceedings Pacific Symposium on Biocomputing, Jan. 3-7, 2002, pp. 271-282, vol. 7, Online, Lihue, Hawaii, USA.

Yoshitani et al., "Performance Evaluation of Parallel Volume Rendering Machine Re Volver/C40", Study Report of Information Processing Society, Mar. 5, 1999, pp. 79-84, vol. 99, No. 21.

Ziv et al., "A Universal Algorithm for Sequential Data Compression", IEEE Trans. Inform. Theory, IT-23(3): 337-343 (1997).

Ziv et al., "Compression of Individual Sequence via Variable-Rate Coding", IEEE Transactions on Information Theory, Sep. 1978, pp. 530-536, vol. IT-24, No. 5, Institute of Electrical and Electronics Engineers, Washington, DC, USA.

Hutchings et al., "Assisting Network Intrusion Detection with Reconfigurable Hardware", FCCM 2002: 10th Annual IEEE Symposium on Field-Programmable Custom Computing Machines, 2002.

International Preliminary Report on Patentability (Chapter I) for PCT/US2008/074862 issued Mar. 11, 2010.

International Search Report for PCT/US2008/074862 dated Nov. 12, 2008.

Jung et al., "Efficient VLSI for Lempel-Ziv Compression in Wireless Data Communication Networks", IEEE Transactions on VISI Systems, Sep. 1998, pp. 475-483, vol. 6, No. 3, Institute of Electrical and Electronics Engineers, Washington, DC, USA.

Keutzer et al., "A Survey of Programmable Platforms—Network Proc", University of California-Berkeley, pp. 1-29.

Lockwood et al., "Field Programmable Port Extender (FPX) for Distributed Routing and Queuing", ACM International Symposium on Field Programmable Gate Arrays (FPGA 2000), Monterey, CA, Feb. 2000, pp. 137-144.

Lockwood et al., "Hello, World: A Simple Application for the Field Programmable Port Extender (FPX)", Washington University, Department of Computer Science, Technical Report WUCS-00-12, Jul. 11, 2000.

Lockwood et al., "Parallel FPGA Programming over Backplane Chassis", Washington University, Department of Computer Science, Technical Report WUCS-00-11, Jun. 12, 2000.

Lockwood et al., "Reprogrammable Network Packet Processing on the Field Programmable Port Extender (FPX)", ACM International Symposium on Field Programmable Gate Arrays (FPGA 2001), Monterey, CA, Feb. 2001, pp. 87-93.

Lockwood, "An Open Platform for Development of Network Processing Modules in Reprogrammable Hardware", IEC DesignCon 2001, Santa Clara, CA, Jan. 2001, Paper WB-19.

Lockwood, "Building Networks with Reprogrammable Hardware", Field Programmable Port Extender: Jan. 2002 Gigabit Workshop Tutorial, Washington University, St. Louis, MO, Jan. 3-4, 2002.

Office Action for U.S. Appl. No. 10/550,323 dated Jan. 3, 2011.

Office Action for U.S. Appl. No. 10/550,326 dated Dec. 23, 2010.

Tau et al., "Transit Note #114: A First Generation DPGA Implementation", Jan. 1995, 9 pages.

Bianchi et al., "Improved Queueing Analysis of Shared Buffer Switching Networks", ACM, Aug. 1993, pp. 482-490.

Brodie et al., "Dynamic Reconfigurable Computing", in Proc. of 9th Military and Aerospace Programmable Logic Devices International Conference, Sep. 2006.

Celko, "Joe Celko's Data & Databases: Concepts in Practice", 1999, pp. 72-74, Morgan Kaufmann Publishers.

Gokhale et al., "Reconfigurable Computing", 2005, pp. 3, 7, 11-15 and 92-93, Springer.

Gokhale et al., "Reconfigurable Computing: Accelerating Computation With Field-Programmable Gate Arrays", 2005, pp. 12-15, Springer.

Gupta et al., "High-Speed Implementations of Rule-Based Systems," ACM Transactions on Computer Systems, May 1989, pp. 119-146, vol. 7, Issue 2.

Gupta et al., "PMM: A Parallel Architecture for Production Systems," Proceedings of the IEEE, Apr. 1992, pp. 693-696, vol. 2.

Motwani et al., "Randomized Algorithms", 1995, pp. 215-216, Cambridge University Press.

Office Action for U.S. Appl. No. 12/201,259 dated Feb. 10, 2012.

Office Action for U.S. Appl. No. 12/201,259 dated Jun. 9, 2011.

Patterson, "High Performance DES Encryption in Virtex™ FPGAs using JBits™", IEEE Symposium on Field-Programmable Custom Computing Machines, 2000, pp. 113-121.

Russ et al., Non-Intrusive Built-In Self-Test for FPGA and MCM Applications, Aug. 8-10, 1995, IEEE, 480-485.

Shasha et al., "Database Tuning", 2003, pp. 280-284, Morgan Kaufmann Publishers.

Skiena et al., "Programming Challenges: The Programming Contest Training Manual", 2003, pp. 30-31, Springer.

Response to Office Action for U.S. Appl. No. 12/201,259 dated Jun. 9, 2011.

Response to Office Action for U.S. Appl. No. 12/201,259 dated Feb. 10, 2012.

U.S. Appl. No. 13/442,442, filed Apr. 9, 2012 (Indeck et al.).

Office Action for U.S. Appl. No. 12/201,259 dated Nov. 13, 2012.

* cited by examiner

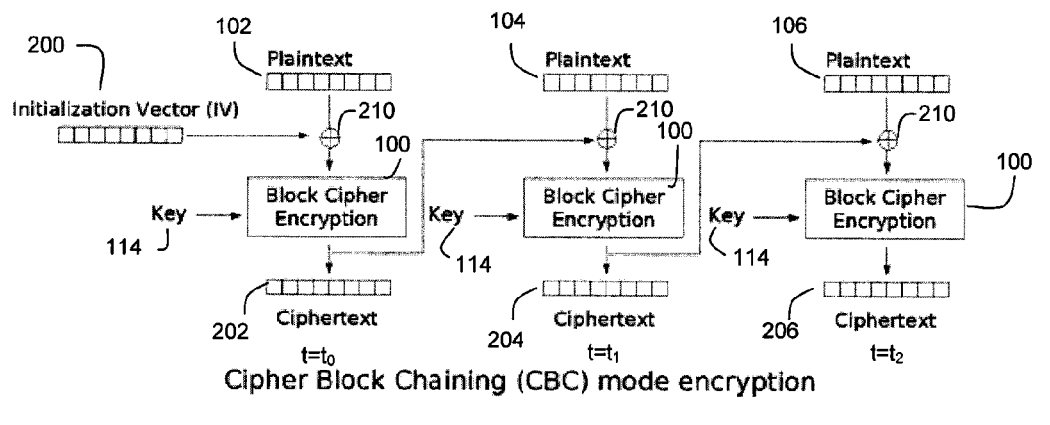
Cipher Block Chaining (CBC) mode encryption
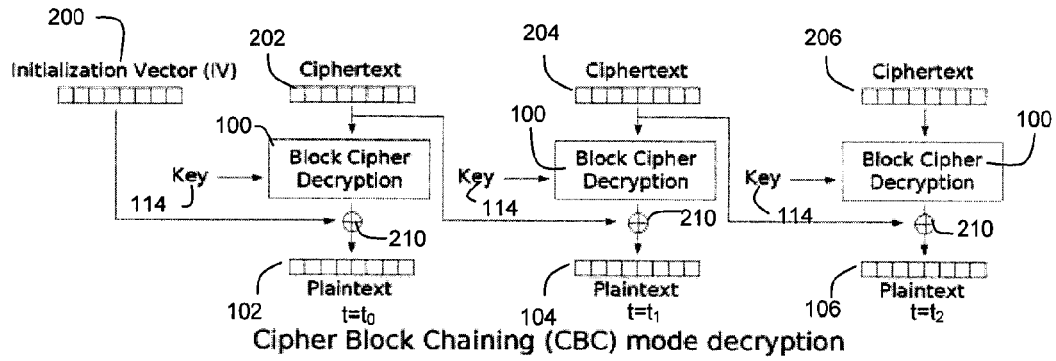
Cipher Block Chaining (CBC) mode decryption
Figure 2   PRIOR ART

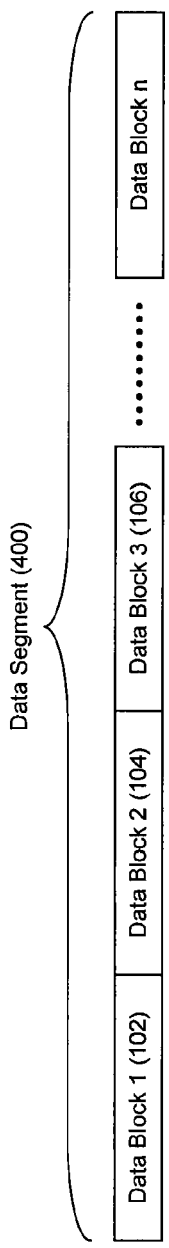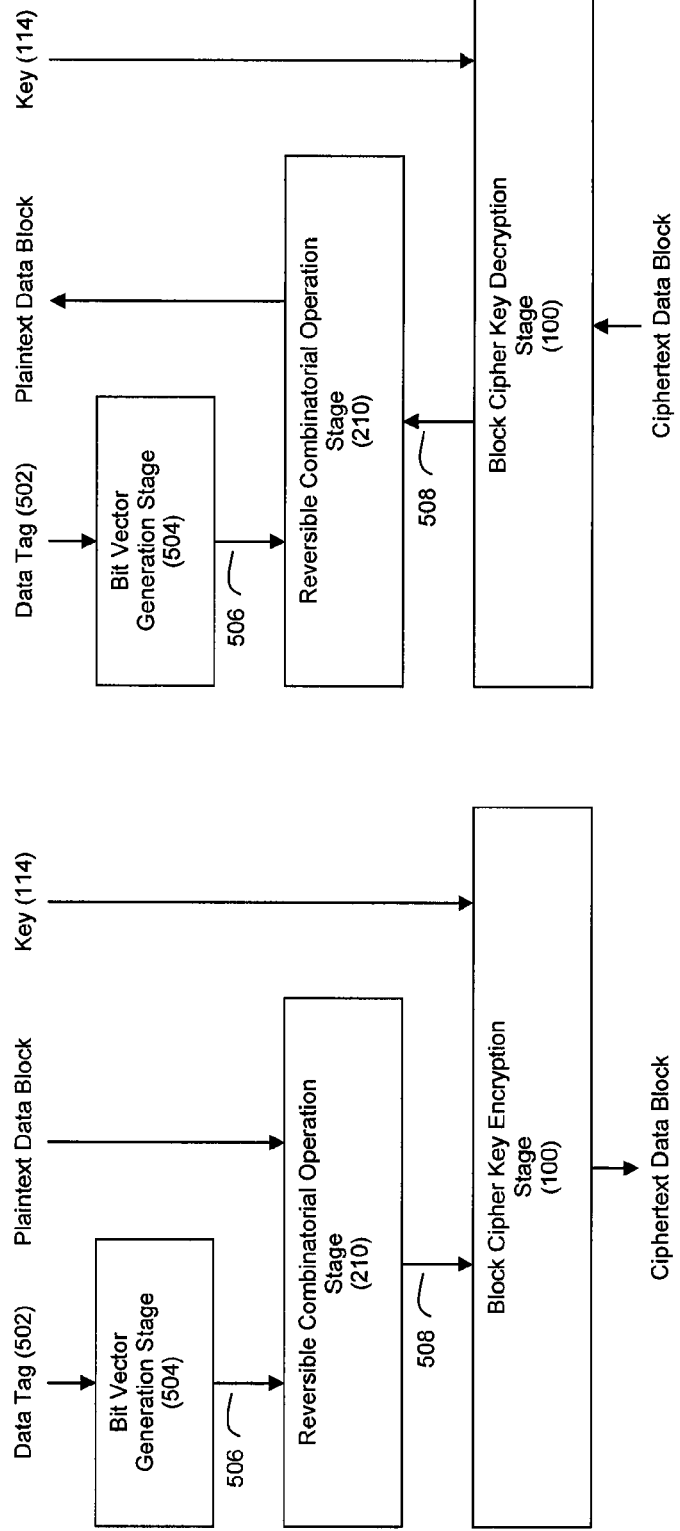

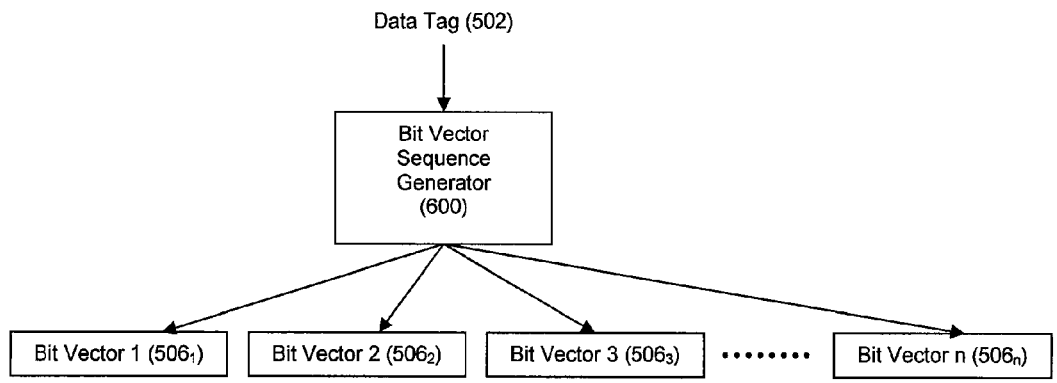
Figure 6
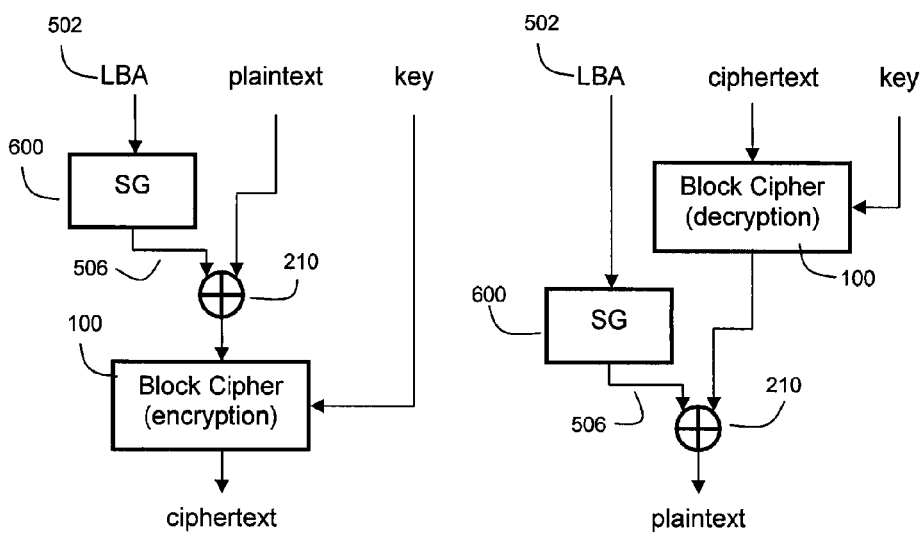
Figure 7(a)          Figure 7(b)

BIR Encryption

BIR Decryption

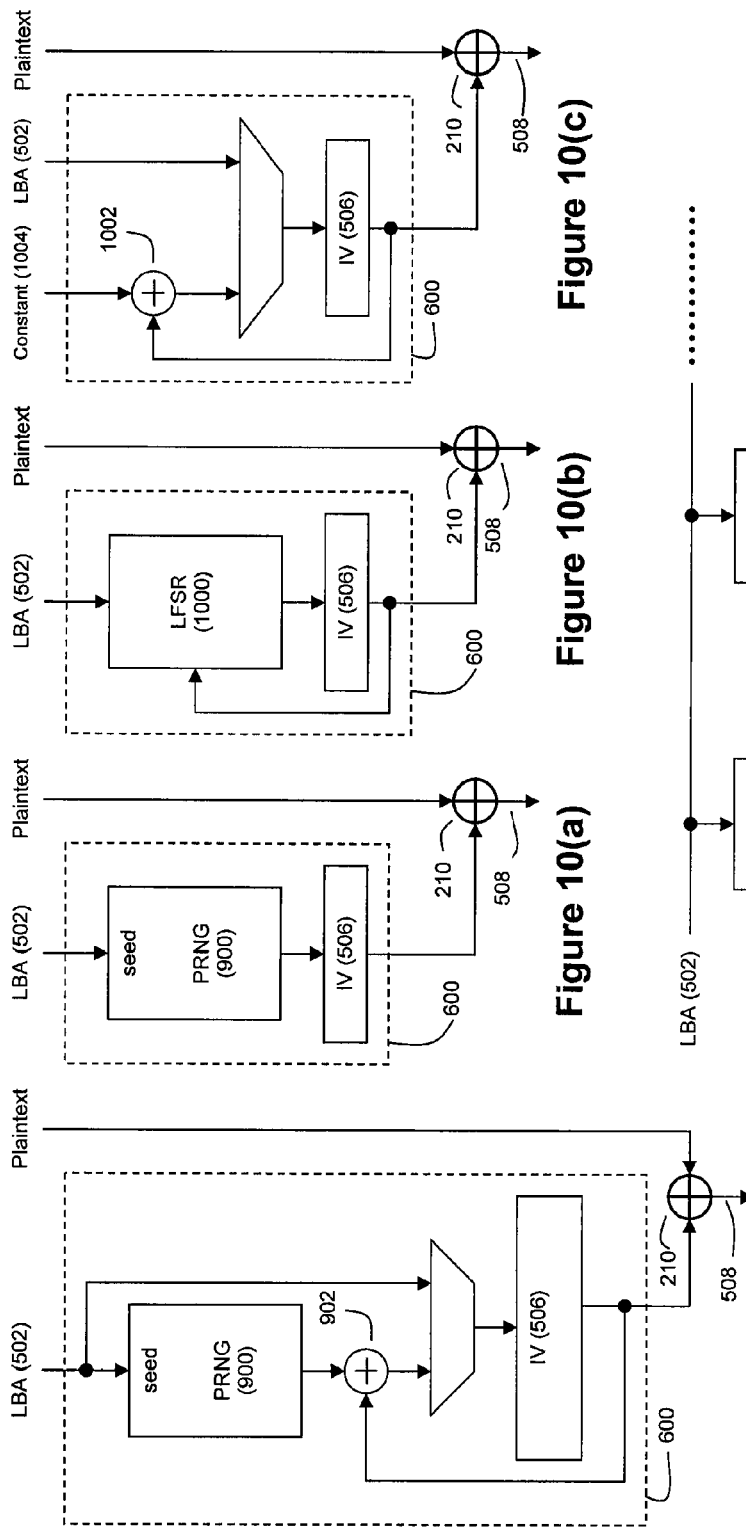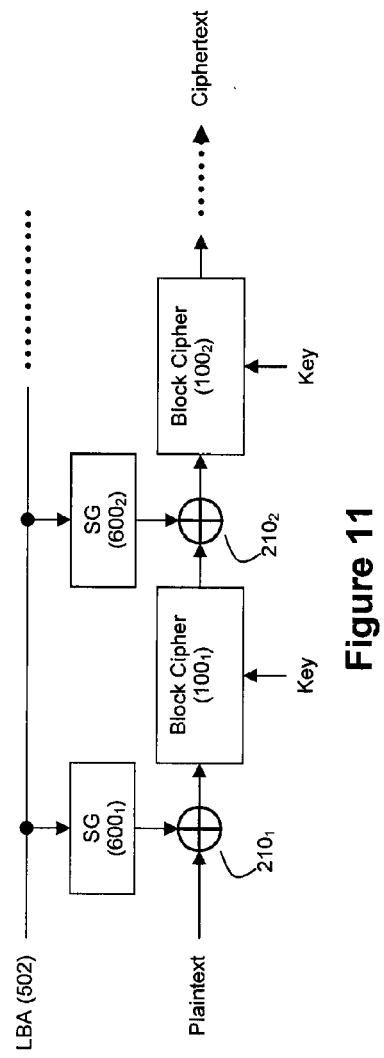

BIR + CBC Encryption

BIR + CBC Decryption

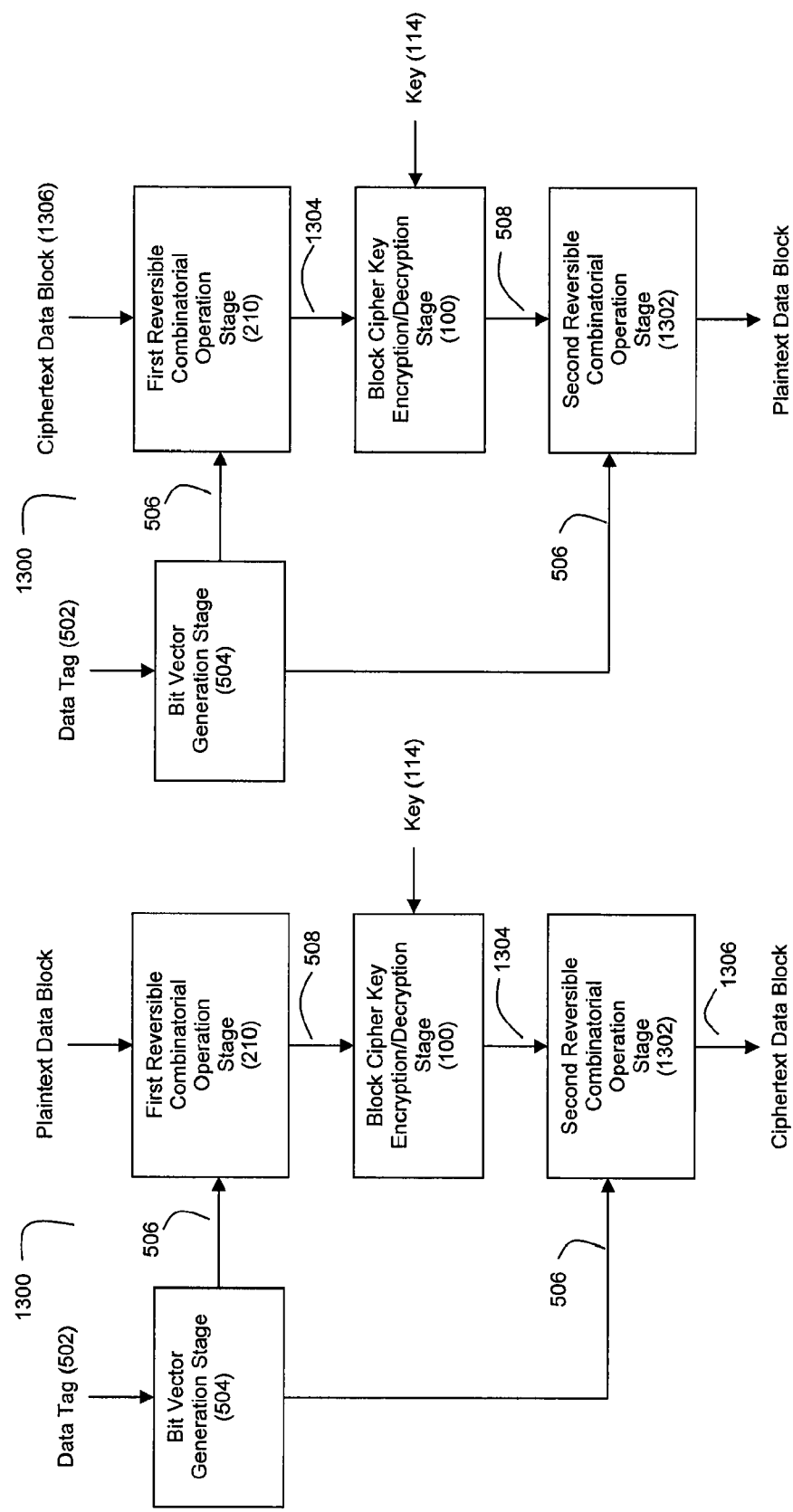

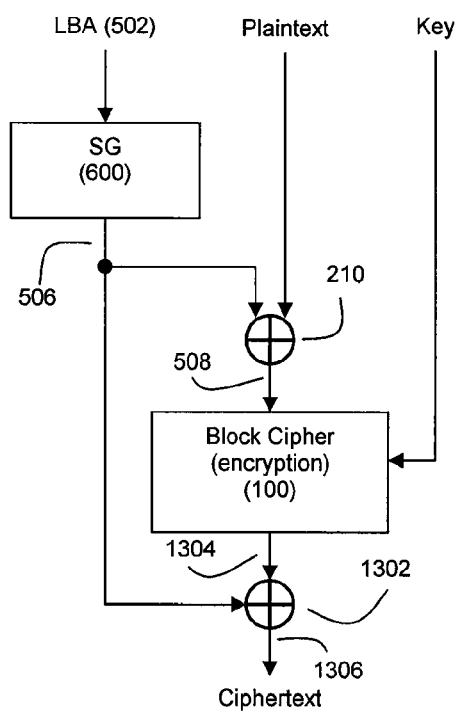 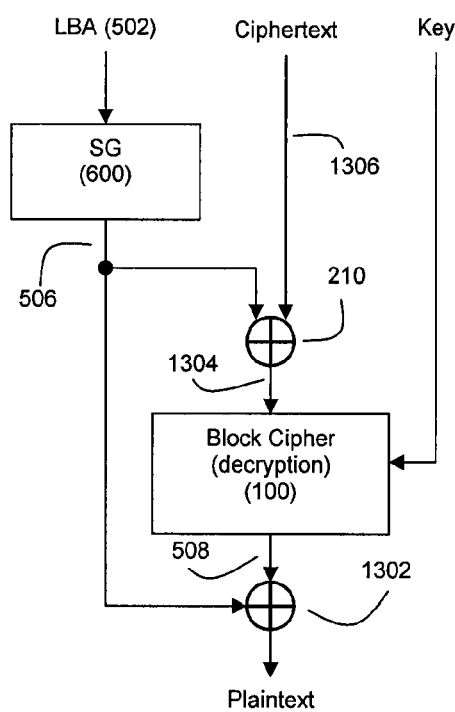
Figure 14(a)      Figure 14(b)

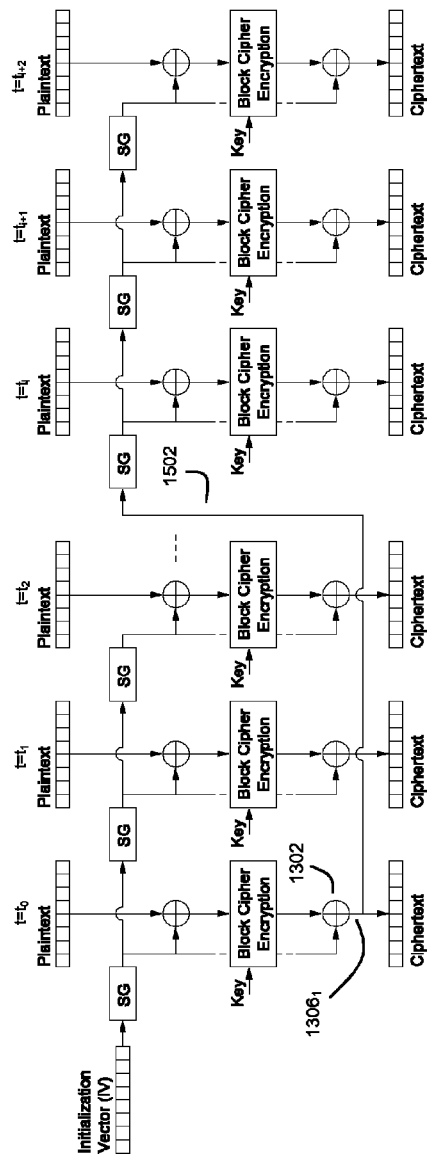
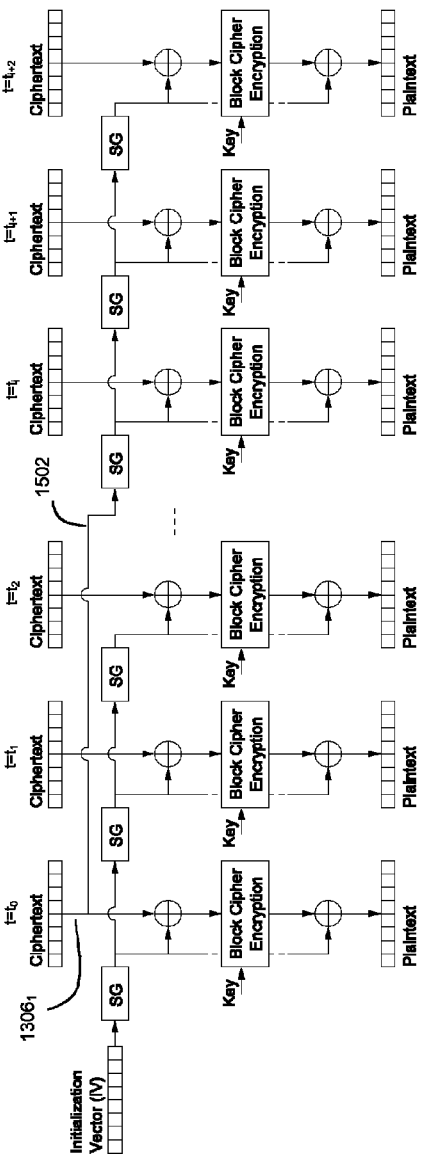
Figure 15(c) Symmetric BIR + CBC Encryption
Figure 15(d) Symmetric BIR + CBC Decryption

METHOD AND SYSTEM FOR HIGH THROUGHPUT BLOCKWISE INDEPENDENT ENCRYPTION/DECRYPTION

CROSS-REFERENCE AND PRIORITY CLAIM TO RELATED PATENT APPLICATION

This application claims priority to provisional patent application 60/785,821, filed Mar. 23, 2006, and entitled "Method and System for High Throughput Blockwise Independent Encryption/Decryption", the entire disclosure of which is incorporated herein by reference.

FIELD OF THE INVENTION

The present invention relates to improved techniques for encrypting and decrypting data.

BACKGROUND AND SUMMARY OF THE INVENTION

The need for effective and efficient data encryption/decryption is widespread throughout today's world. Whether it be data maintained by a governmental agency that pertains to national security or data maintained by a private company that pertains to the company's trade secrets and/or confidential information, the importance of effective and efficient encryption/decryption cannot be understated.

Effective encryption/decryption is needed to preserve the integrity of the subject data. Efficient encryption/decryption is needed to prevent the act of encrypting/decrypting the subject data from becoming an overwhelming burden on the party that maintains the subject data. These needs exist in connection with both "data at rest" (e.g., data stored in non-volatile memory) and "data in flight" (e.g., data in transit from one point to another such as packet data transmitted over the Internet).

A number of data encryption/decryption techniques are known in the art. Many of these encryption techniques utilize a block cipher (see, e.g., block cipher 100 in FIG. 1). A block cipher is a cryptographic mechanism that operates on fixed length blocks of plaintext and produces fixed length blocks of ciphertext (see, e.g., blocks 108, 110 and 112 in FIG. 1). Plaintext refers to data needing encryption and ciphertext refers to data that has been encrypted. A block cipher encrypts each plaintext block using a key as per well-known key-based encryption algorithms (see, e.g., key 114 in FIG. 1). The key is typically (but need not be) the same size as the plaintext block. Using different keys to encrypt the same block of plaintext typically (but need not) produces different blocks of ciphertext. Block ciphers 100 can operate on data blocks of varying sizes, with typical data block sizes ranging between 64 bits and 512 bits. For example, the Advanced Encryption Standard (AES) block cipher operates on blocks of 128 bits (16 bytes). Encrypting large segments of plaintext requires a mode of encryption operation that defines the flow of a sequence of plaintext data blocks through one or more block ciphers. Likewise, decrypting large segments of ciphertext requires a mode of decryption operation that defines the flow of a sequence of ciphertext data blocks through one or more block ciphers.

As an example of one such known mode of encryption/decryption, the electronic codebook (ECB) mode of encryption/decryption is commonly used due to its simplicity and high data throughput. Examples of the ECB mode of encryption/decryption are shown in FIG. 1. With the ECB mode, a data segment needing encryption is divided into a plurality of data blocks, each data block comprising a plurality of data bits (see data blocks 102, 104 and 106 in FIG. 1). Each block cipher 100 then encrypts each data block independently using key 114. At time $t=t_0$, plaintext data block 102 is encrypted by the block cipher 100 using key 114 to produce ciphertext data block 108. Subsequently, at time $t=t_1$, plaintext data block 104 is encrypted by the block cipher 100 using key 114 to produce ciphertext data block 110. Then, at time $t=t_2$, plaintext data block 106 is encrypted by the block cipher 100 using key 114 to produce ciphertext data block 112. To later decrypt the ciphertext data blocks 108, 110 and 112, these steps can then be repeated to reconstruct the original plaintext data blocks 102, 104, and 106. It is worth noting that the same block cipher 100 can be used to both encrypt and decrypt data using a key.

With ECB, the lack of sequential blockwise dependency in the encryption/decryption (i.e., feedback loops where the encryption of a given plaintext block depends on the result of encryption of a previous plaintext data block) allows implementations of the ECB mode to achieve high data throughput via pipelining and parallel processing techniques. While ECB exhibits these favorable performance characteristics, the security of ECB's encryption is susceptible to penetration because of the propagation of inter-segment and intra-segment uniformity in the plaintext to the ciphertext blocks.

For example, a 256 bit segment of plaintext containing all zeros that is to be encrypted with a 64 bit block cipher using ECB will be broken down into 4 64-bit blocks of plaintext, each 64-bit plaintext block containing all zeros. When operating on these plaintext blocks, ECB will produce a segment of ciphertext containing four identical blocks. This is an example of intra-segment uniformity. Furthermore, if another such 256-bit all zero segment is encrypted by ECB using the same key, then both of the resulting ciphertext segments will be identical. This is an example of inter-segment uniformity. In instances where intra-segment and/or inter-segment uniformity is propagated through to ciphertext, the security of the ciphertext can be compromised because the ciphertext will still preserve some aspects of the plaintext's structure. This can be a particularly acute problem for applications such as image encryption.

To address intra-segment and inter-segment uniformity issues, there are two commonly-used approaches. One approach is known as cipher block chaining (CBC). An example of the CBC mode of encryption/decryption is shown in FIG. 2. The CBC mode combines the most recent ciphertext output from the block cipher with the next input block of plaintext. The first plaintext block to be encrypted is combined with an initialization vector that is a bit string whose bits have random values, thereby providing the CBC mode with inter-segment randomness.

As shown in FIG. 2, At time $t=t_0$, the first plaintext data block 102 is combined with a random initialization vector (IV) 200 using a reversible combinatorial operation 210, to thereby create a block-vector combination. This block-vector combination is then encrypted by block cipher 100 using key 114 to thereby generate ciphertext block 202. Next, at time $t=t_1$, the ciphertext block 202 is fed back to be combined with the second plaintext block 104 via XOR operation 210. The resultant block-vector combination is key encrypted by block cipher 100 to produce ciphertext block 204, which is in turn fed back for combination with the next plaintext block at time $t=t_2$ to eventually produce ciphertext block 206. Thus, as can be seen, when the CBC mode is used to encrypt a data segment comprising a plurality of data blocks, the bit vectors that are used for the reversible combinatorial operations with the plaintext data blocks that follow the first plaintext data block are bit vectors that are dependent upon the encryption operation(s) performed on each previously encrypted plaintext data block.

Preferably, the reversible combinatorial operation 210 is an XOR operation performed between the bits of the vector 200 and the block 102. The truth table for an XOR operation between bits X and Y to produce output Z is as follows:

| X | Y | Z |
|---|---|---|
| 0 | 0 | 0 |
| 0 | 1 | 1 |
| 1 | 0 | 1 |
| 1 | 1 | 0 |

As is well known, the XOR operation is reversible in that either of the inputs X or Y can be reconstructed by performing an XOR operation between Z and the other of the inputs X or Y. That is, if one XORs X with Y, the result will be Z. If one thereafter XORs Z with Y, then X will be reconstructed. Similarly, if one thereafter XORs Z with X, then Y will be reconstructed.

Thus, on the decryption side, the CBC mode operates to decrypt ciphertext block 202 with the cipher block 100 using key 114 to thereby reconstruct the XOR combination of plaintext data block 102 and the initialization vector 200. Thereafter, this reconstructed combination can be XORed with the initialization vector 200 to reconstruct plaintext block 102. Next, at time $t=t_1$, the process is repeated for the next ciphertext block 204, although this time the XOR operation will be performed using ciphertext block 202 (rather than initialization vector 200) to reconstruct plaintext data block 104. Ciphertext block 202 is used in this XOR operation because it was ciphertext block 202 that was used in the XOR operation when plaintext block 104 was encrypted. Then, once again this process is repeated at time $t=t_2$, albeit with ciphertext block 204 being used for the XOR combination operation with the output from cipher block 100.

While the use of feedback by the CBC mode addresses the issue of inter-segment and intra-segment uniformity, such feedback imposes a sequential processing flow on the encryption that significantly limits the achievable throughput of the encryption engine. As such, the CBC mode cannot make ready use of pipelining because one of the inputs for the reversible combinatorial operation stage 210 of the encryption for a given data block depends upon the output of the cipher block stage 100 of the encryption performed on the previous data block. That is, because of the feedback, the reversible combinatorial operation stage in a CBC encryption engine must wait for the block cipher to complete its encryption of a given data block-bit vector combination before it can begin to process the next data block.

Furthermore, on the decryption side, the CBC mode's dependence on the sequential order of data block encryption can raise problems when one wants to retrieve only a portion of the encrypted data segment. For example, for a data segment that comprises data blocks $DB_1$ through $DB_{20}$, when that data segment is encrypted and stored for subsequent retrieval in its encrypted form, an instance may arise where there is a need to retrieve data blocks $DB_6$ through $DB_{10}$, wherein the other data blocks of the data segment are not needed. However, to be able to successfully decrypt data blocks $DB_6$ through $DB_{10}$, the retrieval operation and decryption operation will nevertheless need to operate on data blocks $DB_1$ through $DB_5$ so that decryption can be performed for data blocks $DB_6$ through $DB_{10}$.

Furthermore, when used for disk encryption, the CBC mode may be vulnerable to a "watermark attack" if the initialization vector 200 is not kept secret (such as may be the case when the initialization vector is derived from a quantity such as a disk volume number). With such an attack, an adversary can determine from the output ciphertext whether or not a specially crafted file is stored. While there are solutions to such an attack (such as using hashing to derive the initialization vector from the data blocks in the sector), these solutions add to the computational complexity of the encryption operation and thus further degrade the throughput and/or increase the computational resources required for the encryption.

A second approach is known as the Segmented Integer Counter (SIC) mode, or more succinctly the counter (CTR) mode. FIG. 3 depicts an example of the SIC/CTR mode of encryption/decryption. The SIC/CTR mode key encrypts a block comprising a combination of a random value (or nonce) and a counter value. This random value-counter combination can be achieved in any of a variety of ways (e.g., concatenation, XOR, etc.) The counter values may be any sequence of values that do not repeat over a long duration, but a simple incremental counter is believed to be the most commonly-used approach. The output of the block cipher 100 is then combined with the plaintext block using a reversible combinatorial operation 210 (e.g., XOR), with the output of the operation 210 being the ciphertext block. The SIC/CTR mode belongs to the general class of encryption modes known as a stream cipher.

As shown in FIG. 3, at time $t=t_0$, the random value 300 is combined with a counter value 308 in some manner to create a random value-counter combination block 302. This block 302 is then encrypted by block cipher 100 using key 114, and the output therefrom is then XORed with plaintext block 102 to generate ciphertext block 322. Next, at time $t=t_1$, the random value 300 is combined with a next counter value 310 in some manner to create the random value-counter combination block 304. This block 304 is then encrypted by block cipher 100 using key 114, and the output therefrom is then XORed with plaintext block 104 to generate ciphertext block 324. Finally, at time $t=t_2$, the random value 300 is combined with a next counter value 312 in some manner to create the random value-counter combination block 306. This block 306 is then encrypted by block cipher 100 using key 114, and the output therefrom is then XORed with plaintext block 106 to generate ciphertext block 326.

On the decryption side, this process can then be reversed where the combination blocks 302, 304 and 306 are decrypted by block cipher 100 using key 114, with the respective outputs therefrom being XORed with the ciphertext blocks 322, 324 and 326 respectively to reconstruct plaintext blocks 102, 104 and 106.

The SIC/CTR mode of encryption/decryption also suffers from a security issue if data segments are always encrypted with the same random value 300. If an adversary is able to gather several versions of the encrypted data segment, it would be possible to derive information about the plaintext because the cipher text (C) is simply the XOR of the variable (V) based on the random number and the plaintext (P), e.g., $C = P \oplus V$, thus $C \oplus C' = P \oplus P'$.

Therefore, the inventors herein believe that a need exists in the art for a robust encryption/decryption technique that is capable of reducing both inter-segment and intra-segment uniformity while still retaining high throughput and exhibiting blockwise independence. As used herein, an encryption operation for a data segment is said to be "blockwise independent" when the encryption operations for each data block of that data segment do not rely on the encryption operation for any of the other data blocks in that data segment. Likewise, a decryption operation for a data segment is said to be "blockwise independent" when the decryption operations for each encrypted data block of that data segment do not rely on the decryption operation for any of the other data blocks in that data segment.

Toward this end, in one embodiment, the inventors herein disclose a technique for encryption wherein prior to key encryption, the plaintext data block is combined with a blockwise independent bit vector using a reversible combinatorial operation to thereby create a plaintext block-vector combination. This plaintext block-vector combination is then key encrypted to generate a ciphertext block. This process is repeated for all data blocks of a data segment needing encryption. For decryption of the cipher text blocks produced by such encryption, the inventors herein further disclose an embodiment wherein each ciphertext data block is key decrypted to reconstruct each plaintext block-vector combination. These reconstructed plaintext block-vector combinations can then be combined (using the reversible combinatorial operation) with the corresponding randomized bit vectors that were used for encryption to thereby reconstruct the plaintext blocks.

As an improvement relative to the CBC mode of encryption/decryption, each bit vector is blockwise independent. A bit vector is said to be blockwise independent when the value of that bit vector does not depend on any results of an encryption/decryption operation that was performed on a different data block of the data segment. Because of this blockwise independence, this embodiment is amenable to implementations that take advantage of the power of pipelined processing and/or parallel processing.

Moreover, because of the blockwise independent nature of the encryption performed by the present invention, a subset of the encrypted data segment can be decrypted without requiring decryption of the entire data segment (or at least without requiring decryption of the encrypted data blocks of the data segment that were encrypted prior to the encrypted data blocks within the subset). Thus, for a data segment that comprises data blocks $DB_1$ through $DB_{20}$, when that data segment is encrypted and stored for subsequent retrieval in its encrypted form using the present invention, a need may arise to retrieve plaintext versions of encrypted data blocks $DB_6$ through $DB_{10}$ and $DB_{15}$, wherein the other data blocks of the data segment are not needed in their plaintext forms. A preferred embodiment of the present invention supports successful decryption of a subset of data blocks within the encrypted data segment (e.g., data blocks $DB_6$ through $DB_{10}$ and $DB_{15}$) without requiring the decryption of the data segment's data blocks that are not members of the subset (e.g., data blocks $DB_1$ through $DB_5$, data blocks $DB_{11}$ through $DB_{14}$ and data blocks $DB_{16}$ through $DB_{20}$). Accordingly, the present invention supports the decryption of any arbitrary subset of the encrypted data blocks of a data segment without requiring decryption of any data blocks that are non-members of the arbitrary subset even if those non-member data blocks were encrypted prior to the encryption of the data blocks within the arbitrary subset.

Similarly, even if an entire encrypted data segment is to be decrypted, the present invention supports the decryption of the encrypted data blocks in a block order independent manner. Further still, the present invention supports the encryption of data blocks in a block order independent manner as well as supports limiting the encryption to only a defined subset of a data segment's data blocks (wherein such a subset can be any arbitrary subset of the data segment's data blocks).

Furthermore, as an improvement relative to the SIC/CTR mode of encryption/decryption, a greater degree of security is provided by this embodiment because the data that is subjected to key encryption includes the plaintext data (whereas the SIC/CTR mode does not subject the plaintext data to key encryption and instead subjects only its randomized bit vector to key encryption).

Preferably, the blockwise independent bit vector is a blockwise independent randomized (BIR) bit vector. As is understood by those having ordinary skill in the art, randomization in this context refers to reproducible randomization in that the same randomized bit vectors can be reproduced by a bit vector sequence generator given the same inputs. Further still, the blockwise independent randomized bit vector is preferably generated from a data tag that is associated with the data segment needing encryption/decryption. Preferably, this data tag uniquely identifies the data segment. In a disk encryption/decryption embodiment, this data tag is preferably the logical block address (LBA) for the data segment. However, it should be noted that virtually any unique identifier that can be associated with a data segment can be used as the data tag for that data segment. It should also be noted that rather than using a single data tag associated with the data segment, it is also possible to use a plurality of data tags that are associated with the data segment, wherein each data tag uniquely identifies a different one of the data segment's constituent data blocks.

A bit vector generation operation preferably operates on a data tag to generate a sequence of blockwise independent bit vectors, each blockwise independent bit vector for reversible combination with a corresponding data block. Disclosed herein are a plurality of embodiments for such a bit vector generation operation. As examples, bit vectors can be derived from the pseudo-random outputs of a pseudo-random number generator that has been seeded with the data tag; including derivations that employ some form of feedback to enhance the randomness of the bit vectors. Also, linear feedback shift registers and adders can be employed to derive the bit vectors from the data tag in a blockwise independent manner.

The inventors also disclose a symmetrical embodiment of the invention wherein the same sequence of operations are performed on data in both encryption and decryption modes.

One exemplary application for the present invention is to secure data at rest in non-volatile storage; including the storage of data placed on tape, magnetic and optical disks, and redundant array of independent disks (RAID) systems. However, it should be noted that the present invention can also be applied to data in flight such as network data traffic.

These and other features and advantages of the present invention will be apparent to those having ordinary skill in the art upon review of the following description and figures.

BRIEF DESCRIPTION OF THE DRAWINGS

FIG. 2 depicts an example of a known CBC mode of encryption/decryption;

FIG. 4 depicts an exemplary data segment;

FIGS. 5(*a*) and (*b*) depict an embodiment of the present invention in both encryption and decryption modes;

FIG. 6 depicts an exemplary bit vector sequence generator;

FIGS. 7(*a*) and (*b*) depict exemplary encryption and decryption embodiments of the present invention;

FIG. 9 depicts an exemplary embodiment of a bit vector sequence generator;

FIGS. 10(a)-(c) depict three additional exemplary embodiments of a bit vector sequence generator;

FIG. 11 depicts an exemplary embodiment of the present invention where multiple block ciphers are chained together;

FIGS. 13(a) and (b) depict an exemplary embodiment for symmetrical encryption/decryption in accordance with the present invention;

FIGS. 14(a) and (b) depict an exemplary embodiment for symmetrical encryption/decryption in accordance with the present invention wherein the blockwise independent bit vectors are derived from the data segment's LBA;

DETAILED DESCRIPTION OF THE PREFERRED EMBODIMENTS

Figure 1:
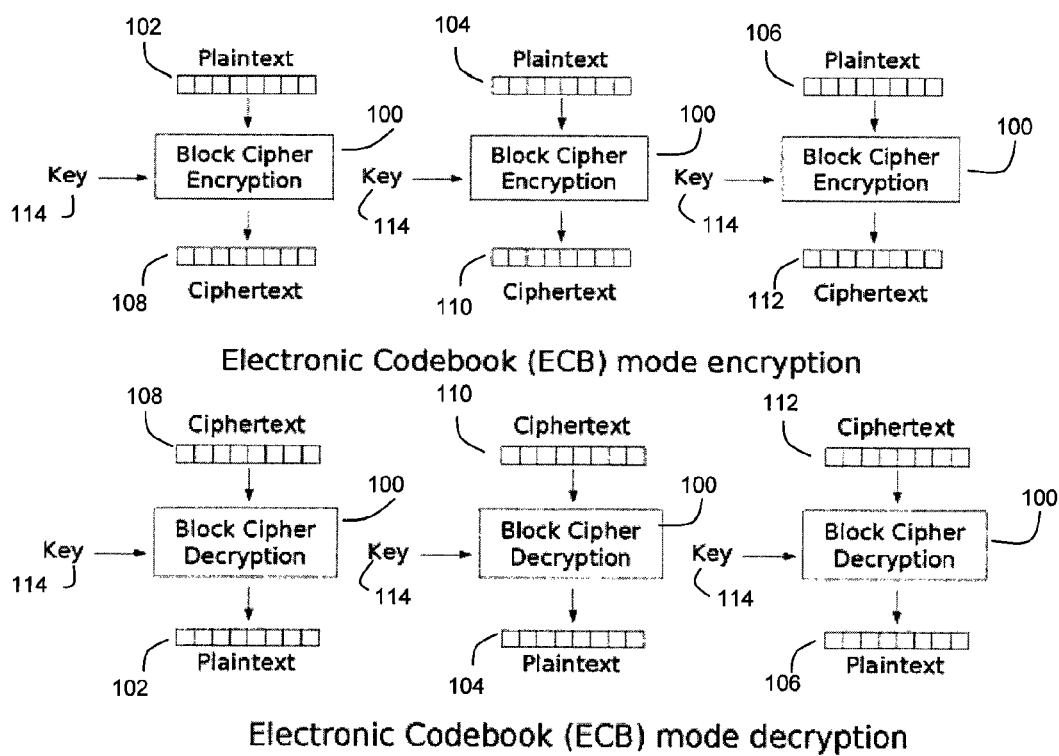
FIG. 1 depicts an example of a known ECB mode of encryption/decryption.
Figure 3:
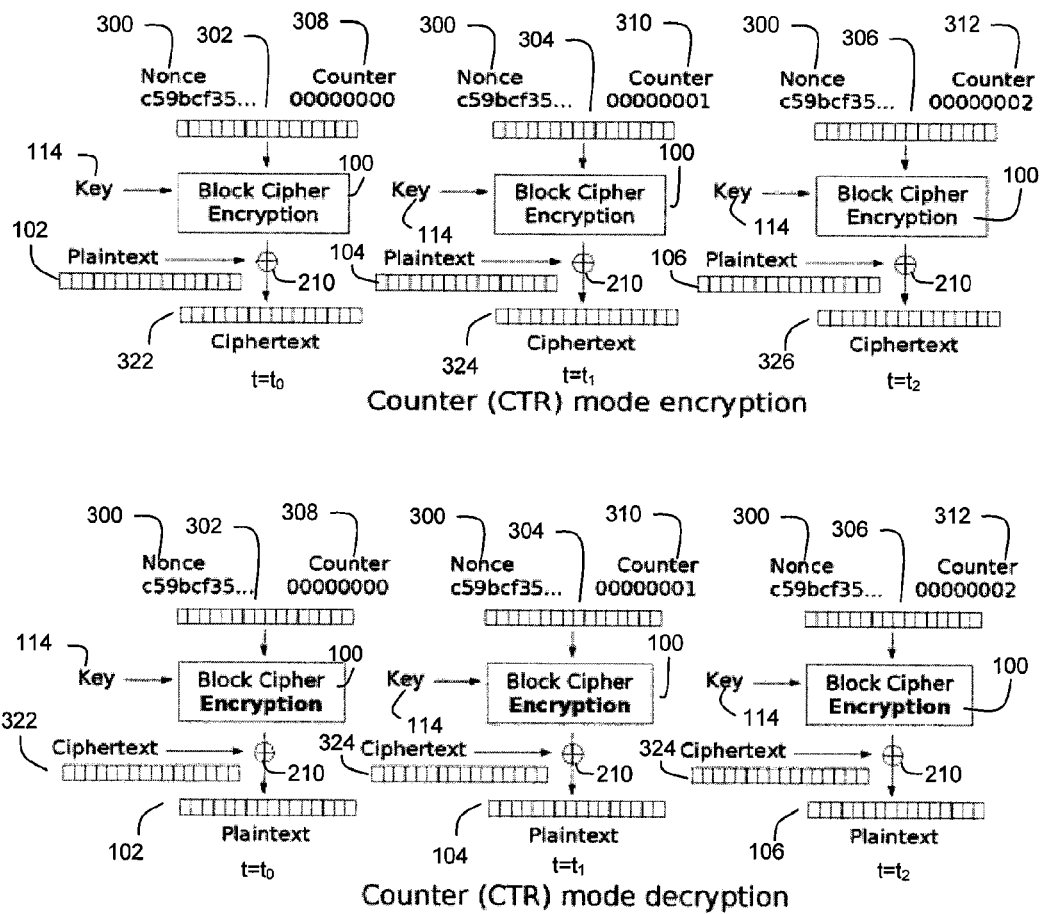
FIG. 3 depicts an example of a known SIC/CTR mode of encryption/decryption.

FIG. 4 illustrates an exemplary data segment 400 on which the encryption/decryption technique of the present invention can be performed. The data segment 400 comprises a plurality of data blocks 102, 104, 106, . . . . Each data block comprises a plurality of data bits and preferably has a fixed length (e.g., 64 bits, 256 bits, etc.). In an exemplary embodiment, wherein AES block ciphers are used, which as explained above operate on 16-byte data blocks, it is preferred that the data blocks 102, 104, 106 . . . possess a length of 16 bytes. It should also be noted that the size of the data segment 400 is typically much larger than the size of an individual data block. For example, a data storage system may operate on "logical blocks" of data having a size of 512 bytes. In such a case, the "logical block", which can serve as the data segment 400, will be a collection of 32 16-byte data blocks.

FIG. 5(a) illustrates an embodiment of the present invention wherein the encryption operation is segmented into a plurality of stages. At stage 504, the blockwise independent bit vector 506 is generated, preferably from a data tag 502 that is associated with the data segment 400. Preferably, the bit vector 506 has a length that is the same as the data blocks of the data segment, although this need not be the case. Further still, it is preferred that the blockwise independent bit vector 506 have a randomized value to thereby enhance the security of the encryption. Also, it is preferred that a different bit vector 506 be generated for each data block of a data segment that is encrypted, although this need not be the case. The bit vectors that are used in the encryption of a data segment's data blocks should be either stored for subsequent use when it is time to decrypt one or more of the data segment's data blocks or should be reproducible from a known quantity (such as the data tag) when it is time to decrypt one or more of the data segment's data blocks.

At stage 210, a reversible combinatorial operation such as a bitwise XOR operation is performed on the blockwise independent bit vector 506 and plaintext data block. This reversible combinatorial operation preferably produces a data block-bit vector combination 508.

At stage 100, a block cipher performs an encryption operation on the data block-bit vector combination 508 using key 114 as per well-known key encryption techniques (e.g., AES, the Data Encryption Standard (DES), the triple DES (3DES), etc.). The output of the block cipher stage 100 is thus a ciphertext data block that serves as the encrypted counterpart to the plaintext data block that was fed into stage 210. It should be noted that any of several well-known key management techniques can be used in connection with managing the key(s) 114 used by the block cipher(s) 100. As such, the inventors do not consider the key management for the block cipher(s) 100 to be any limitation on the present invention. It should also be noted that "keyless" encryption techniques may also be used in the practice of the present invention (e.g., substitution ciphers that do not require a key).

FIG. 5(b) depicts the decryption counterpart to FIG. 5(a). In FIG. 5(a), the flow of data blocks and stages is reversed such that the ciphertext data block is first key decrypted by stage 100 to reconstruct combination 508. Combination 508 is in turn combined with the same bit vector 506 that was used when creating that ciphertext data block and using the same reversible combinatorial operation 210 that was used when creating that ciphertext data block, to thereby reconstruct the plaintext data block.

As can be seen in FIGS. 5(a) and (b), no feedback is required between stages, thus allowing this encryption/decryption technique to be implemented in a pipelined architecture and/or a parallel processing architecture for the achievement of a high throughput when performing encryption/decryption. Thus, as a stream of data blocks are sequentially processed through the encryption/decryption stages, a high throughput can be maintained because the reversible combinatorial stage 210 can operate on a given data block while the block cipher stage 100 simultaneously operates on a different data block because the reversible combinatorial operation stage 210 does not require feedback from the block cipher stage 100 to operate.

The data tag 502 may be any data value(s) that can be associated with the data segment 400. Preferably, the data tag 502 serves as a unique identifier for the data segment 400, although this need not be the case. A preferred data tag 502 is the logical block address (LBA) for the data segment to be encrypted. An LBA for a data segment is the logical memory address for the data segment that is typically assigned by an Operating System (OS) or memory management system. However, other data tags may be used in the practice of the present invention; examples of which include file identifiers, physical memory addresses, and packet sequence numbers. The source of the data tag can be any of a variety of sources, including but not limited to communication protocol, storage subsystem, and file management systems.

FIG. 6 illustrates how a sequence of bit vectors 506 can be generated from a data tag 502. As an exemplary embodiment of bit vector generation stage 504, bit vector sequence generator 600 preferably operates to produce a plurality of blockwise independent randomized bit vectors $506_i$ from an input comprising data tag 502. FIGS. 9 and 10, to be described hereinafter, illustrate various exemplary embodiments for the bit vector sequence generator 600.

FIGS. 7(a) and (b) illustrate embodiments of the invention where the data segment's LBA is used as the data tag 502 for the encryption/decryption operations. Sequence generator 600 processes the LBA to produce a different blockwise independent randomized bit vector 506 for XOR combination (210) with each plaintext data block. On decryption (shown in FIG. 7(b)), the sequence generator 600 operates to produce the same plurality of different bit vectors 506 from the data segment's LBA as were produced by the sequence generator 600 for encryption (see FIG. 7(a)) given the same LBA input. Thus, as shown in FIG. 7(b), each bit vector 506 is then used for XOR combination (210) with each decrypted ciphertext block.

Figure 8A:
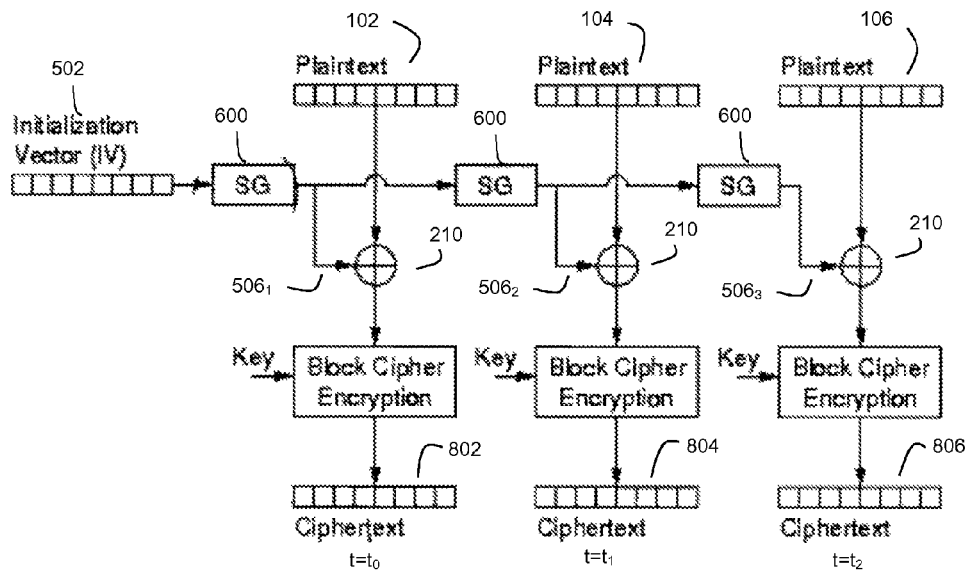
FIGS. 8(a) and (b) depict exemplary encryption and decryption embodiments of the present invention showing their operations over time.

FIG. 8(a) illustrates the embodiment of FIG. 7(a) (wherein the LBA is labeled as an initialization vector), but depicting how the encryption operation can proceed over time. Thus, at time t=$t_0$, plaintext data block 102 is reversibly combined with bit vector $506_1$ produced by sequence generator 600 to generate a data block-bit vector combination that is key encrypted by a block cipher 100 to thereby produce an encrypted data block-bit vector combination 802 which serves as the ciphertext block. Subsequently, at time t=$t_1$, the sequence generator produces another bit vector $506_2$ for reversible combination with plaintext data block 104. The resultant data block-bit vector combination is then key encrypted by the block cipher 100 to thereby produce an encrypted data block-bit vector combination 804 which serves as the next ciphertext block. This process then continues for subsequent clock cycles as additional data blocks of the data segment 400 are encrypted.

Figure 8B:
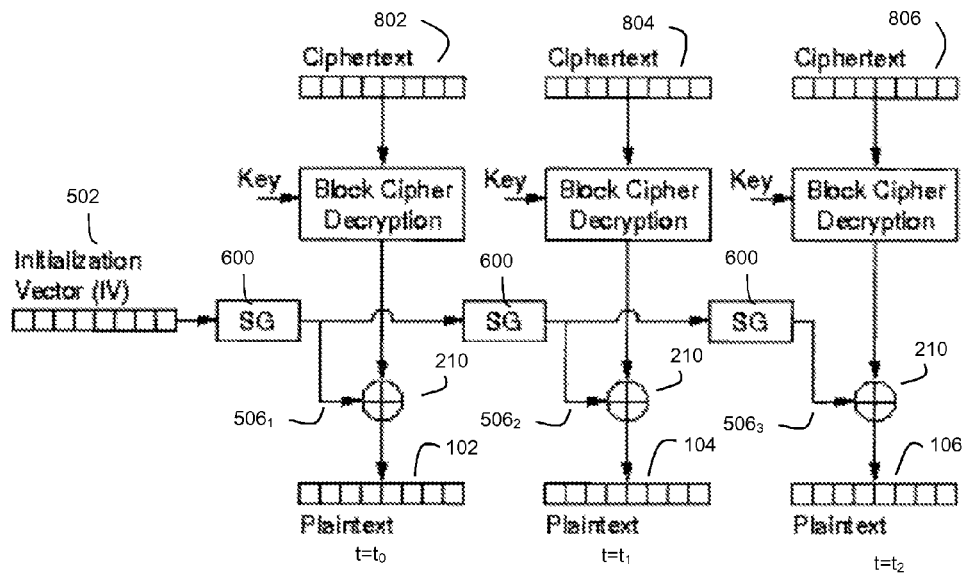

FIG. 8(b) depicts the decryption counterpart to FIG. 8(a), wherein ciphertext blocks 802, 804 and 806 are decrypted in accordance with the embodiment of FIG. 7(b) to reproduce plaintext data blocks 102, 104 and 106.

FIG. 9 depicts an embodiment of the sequence generator 600 wherein a data tag 502 such as the LBA is used to seed a pseudo-random number generator (PRNG) 900. When encrypting a first data block, the bit vector 506 is initialized to be the LBA itself. Then, when encrypting subsequent data blocks, the bit vector 506 is incremented through adder 902 by the pseudo-random output from the PRNG 900. Preferably, a new pseudo-random number is generated by the PRNG 900 for each new data block of the data segment needing encryption. By using a PRNG 900 to generate counter increments for the bit vector 506, the sequence of bit vectors 506 used for encrypting different data segments (identified by their LBA) will be difficult to predict and provide more security than a simple counter. For decryption, it should be noted that the PRNG 900 should operate to produce the same sequence of pseudo-random outputs given the same data tag input, to thereby enable the generation of the same set of bit vectors 506 when decrypting the encrypted data segment (or a subset of the encrypted data segment).

As can be seen, the sequence of bit vectors $506_1$, $506_2$, ... $506_n$ produced by the sequence generator 600 of FIG. 9 will be sequentially dependent in that each successive bit vector $506_i$ will be a function of the previous bit vector $506_{i-1}$ (via feedback to adder 902). This sequential nature of the bit vectors does not preclude their use in a blockwise independent encryption/decryption scheme. For example, consider a case where a data tag (such as an LBA) for a data segment comprising twenty data blocks is used as the basis for the blockwise independent bit vectors, but it is only desired to encrypt/decrypt data blocks $DB_6$ through $DB_{10}$. In such a case, the sequence generator 600 is preferably initialized with the data tag and the bit vectors for data blocks $DB_1$ through $DB_5$ are generated but discarded by the sequence generator 600. Such a configuration will require the reversible combinatorial stage 210 and the downstream encryption stage 100 to pause until the bit vector $506_6$ for data block $DB_6$ is generated. While this pause produces a delay and degradation in throughput for the encryption/decryption technique, relative to the multiple iterations through a block cipher as required in the conventional CBC mode of encryption, the inventors herein believe that this delay and throughput degradation is relatively minor. For example, this pause will not need to wait for data blocks $DB_1$ through $DB_5$ to be encrypted/decrypted via block cipher 100 before being able to process data block $DB_6$.

It should also be noted that if the encryption/decryption technique involves using a data tag that is unique to each data block to generate each data block's corresponding blockwise independent bit vector 506, the need to pause operations while cycling through unneeded bit vectors can be eliminated.

FIGS. 10(a)-(c) depict other examples of sequence generator embodiments. FIG. 10(a) discloses a sequence generator 600 that uses the LBA 502 to seed a PRNG 900 whose pseudo-random outputs then serve as the bit vectors 506 for combination with the data segment's data blocks. As with the embodiment of FIG. 9, preferably the LBA itself is used as the bit vector 506 for reversible combination with a first data block to be encrypted/decrypted.

FIG. 10(b) discloses a sequence generator 600 that uses the LBA 502 to seed a linear feedback shift register (LFSR) 1000 whose outputs then serve as the bit vectors 506 for combination with the data segment's data blocks.

FIG. 10(c) discloses a sequence generator 600 that uses the LBA 502 to seed a feedback counter 1002, wherein the feedback counter 1002 has a constant increment 1004, and wherein the counter's outputs then serve as the bit vectors 506 for combination with the data segment's data blocks. As with the embodiments of FIG. 9 and FIG. 10(a), preferably the LBA itself is used as the bit vector 506 for reversible combination with a first data block to be encrypted/decrypted. It should be noted that the sequence generator embodiment of FIG. 10(c) can be configured to accommodate encryption/decryption of arbitrary subsets of data blocks within a data segment without requiring a pause while the sequence generator cycles through unneeded bit vectors. If an encryption/decryption is to begin at a data block within a data segment that is not the first data block of the data segment (e.g., data block $DB_k$ of a data segment, wherein k>1), the data tag 502 (such as an LBA) that is passed to the sequence generator 600 can be computed as:

$$\text{Data Tag}' = \text{Data Tag} + k * \text{Constant}$$

wherein Data Tag' represents the value of the data tag 502 that is fed into the sequence generator 600, wherein Data Tag represents the value of the data tag that is associated with the data segment, wherein k represents the block number within the data segment of the data block to be encrypted/decrypted, and wherein Constant represents the value of the incremental constant 1004 for adder 1002. This computation can be performed either within the sequence generator (in which case it will be the value Data Tag that is fed into the sequence generator 600) or in a module upstream from the sequence generator. Appropriate control logic is preferably used to control whether the multiplexer passes the data tag value 502 or the output of adder 1002 on to the reversible combinatorial stage 210.

It should also be noted that the present invention need not be limited to a single combination of a blockwise independent bit vector randomizer and a block cipher. Pairs of sequence generators 600, reversible combinatorial operations 210, and block ciphers 100 can be sequentially chained as shown in FIG. 11. Thus, a first sequence generator 600₁, a first reversible combinatorial operator 210₁ and a first block cipher 100₁ can operate to produce an encrypted data block-bit vector combination that is fed into a second reversible combinatorial operator 210₂ for reversible combination with a bit vector produced by a second sequence generator 600₂. The resultant encrypted data block-bit vector-bit vector combination produced by reversible combinatorial operator 210₂ can then be key encrypted by block cipher 100₂. The inventors herein believe that such chaining can enhance the security of an encryption system. Moreover, the inventors note that still greater numbers of sequence generators 600, reversible combinatorial operations 210, and block ciphers 100 can be sequentially chained to enhance security if desired by a practitioner of this embodiment of the invention. It should also readily be understood that corresponding sequential decryption chains can be used. Preferably, in such a sequential chaining embodiment, each different sequence generator 600ᵢ will operate to produce different set of bit vectors given the same input.

Figure 12A:
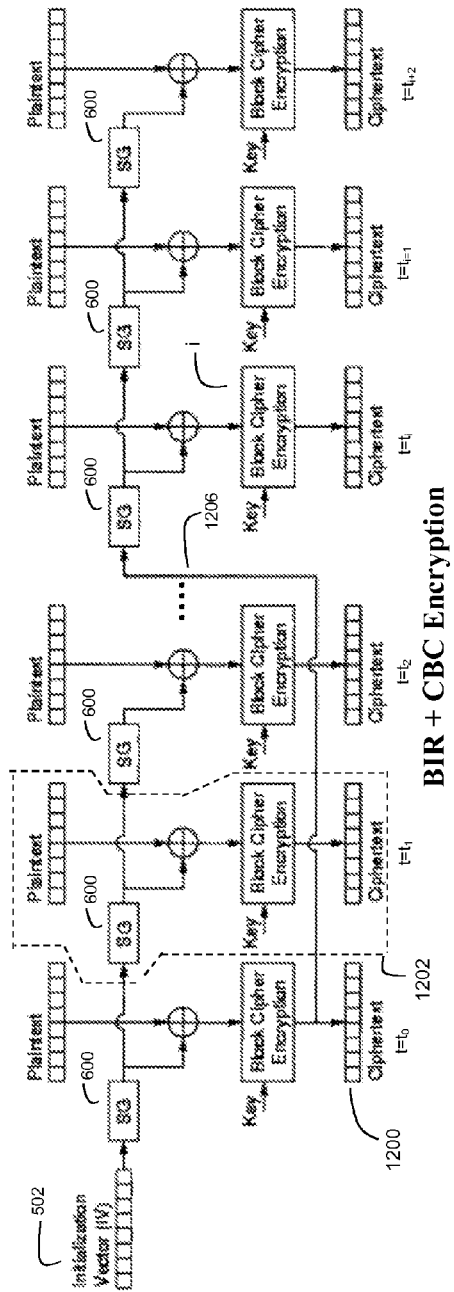
FIGS. 12(a) and (b) depict exemplary encryption and decryption embodiments of the present invention that are hybrids of the embodiments of FIGS. 8(a) and (b) and the CBC mode of encryption/decryption.
Figure 12B:
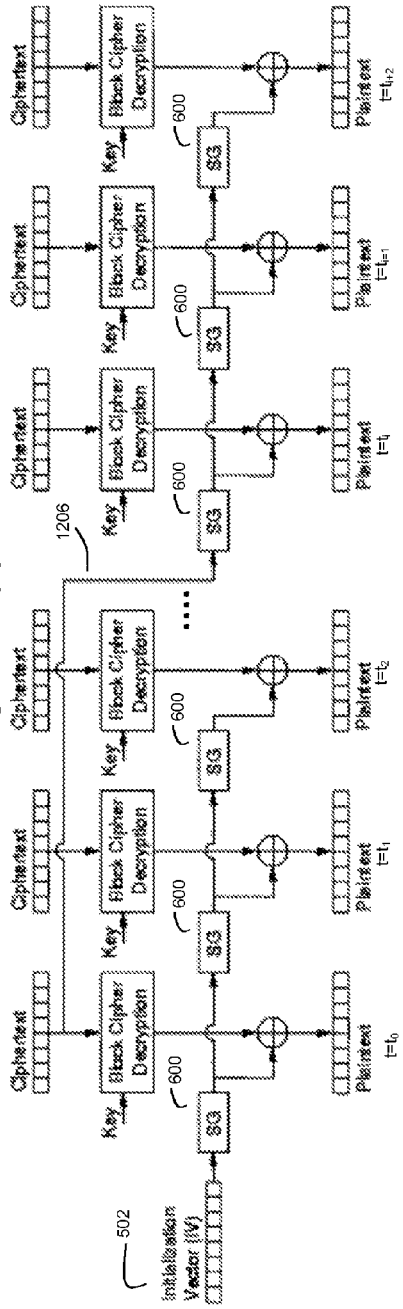
FIGS. 12(c) and (d) depict exemplary embodiments of the bit vector sequence generator for use with the hybrid embodiments of FIGS. 12(a) and (b)

Further still, the inventors herein disclose an embodiment that hybridizes the present invention and the CBC mode of encryption/decryption. FIG. 12(a) illustrates an example of such an embodiment to perform encryption. This configuration provides the flexibility to include some feedback for higher security. Note that the first output of ciphertext 1200 is not used as feedback to the second encryption operation 1202, rather it is used as feedback for encryption performed by subsequent block i where i is a feedback stride. The feedback stride can then be chosen to provide a favorable balance among security and throughput. If the feedback stride i is greater than or equal to the number of pipeline stages in the block cipher, then there is no performance penalty because there will need not be a delay in the insertion of a block into a block cipher. Furthermore, if one does choose a lower feedback stride value that would require a delay, one can introduce stall cycles in the processing. The added security provided by the technique of FIG. 12(a) is that the encryption technique of FIG. 12(a) does not exclusively rely on the sequence generator 600 (or the PRNG 900 in the sequence generator 600) to generate long, difficult to predict initialization sequences. Once the system begins feeding back ciphertext from previous blocks via feedback link 1206, the system gains the strength of the block cipher in producing more random initialization bit vectors. This technique essentially narrows the visibility of an observer into the "window" of the random increments produced by the PRNG 900. Thus, it is more difficult for observers to reconstruct the entire random sequence generated by the PRNG 900 (thereby making it more difficult for one to crack the encryption scheme). FIG. 12(b) depicts a decryption counterpart to FIG. 12(a).

Figure 12D:
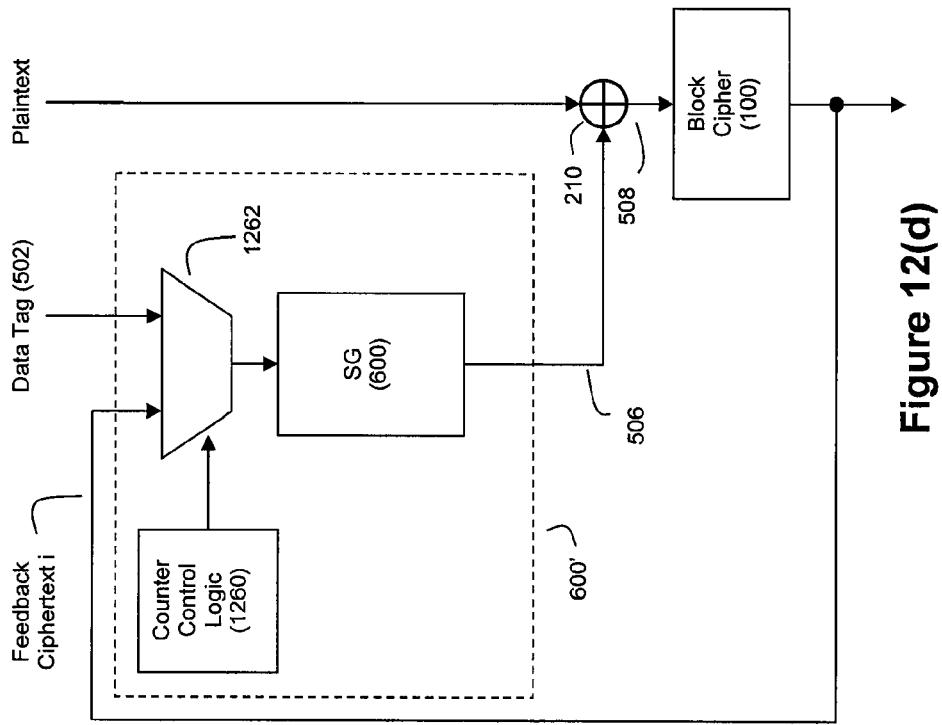
Figure 12C:
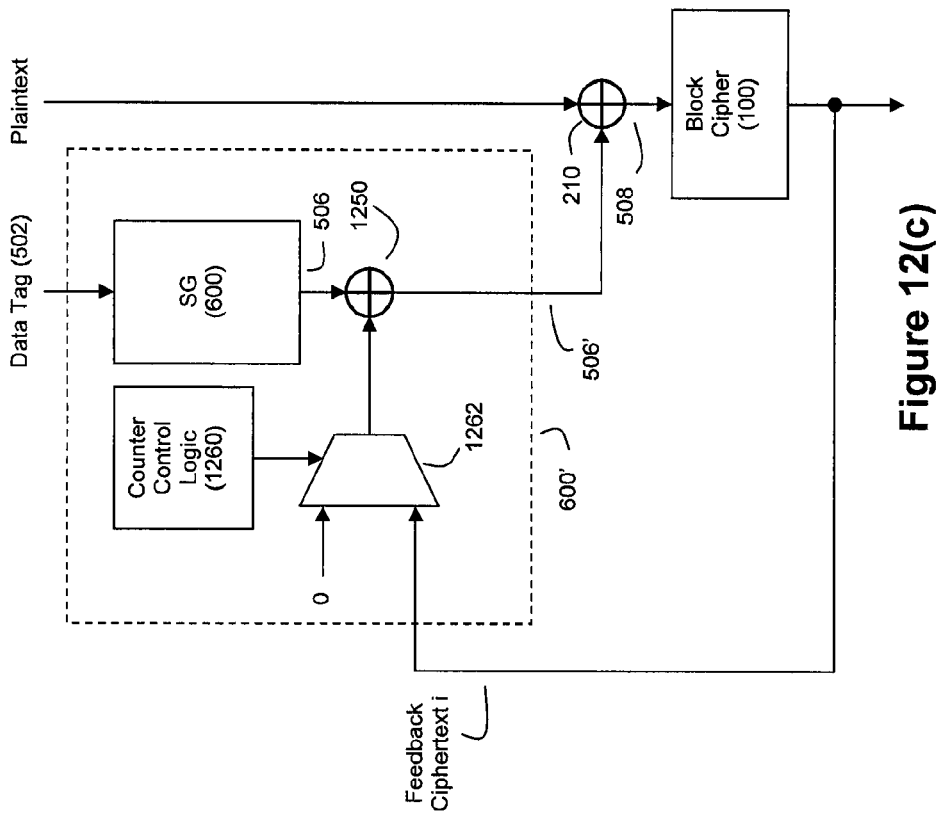

FIGS. 12(c) and (d) depict exemplary embodiments of a sequence generator 600' that could be used to generate bit vectors for the embodiments of FIGS. 12(a) and (b). In the example of FIG. 12(c), the sequence generator 600' comprises any of the embodiments for sequence generator 600 as described in connection with FIGS. 9 and 10(a)-(c). The bit vector 506 that is output by the sequence generator 600 is preferably reversibly combined with the feedback ciphertext i from link 1206 via reversible combinatorial operator 1250 to produce bit vector 506' (which is in turn provided to the reversible combinatorial operator 210) when the conditions for the feedback stride i are met. Sequence generator 600' also preferably includes appropriate control logic to ensure that the feedback stride i defined for the hybrid embodiment is obeyed. As an example, such control can be achieved with a multiplexer 1262 whose inputs are either null value or the feedback ciphertext i. A counter-based control circuit 1260 can define which of the inputs to multiplexer 1262 are passed to the reversible combinatorial operator 1250 such that the feedback ciphertext i is only passed on when it is time to use the ciphertext to further randomize the bit vectors.

FIG. 12(d) depicts another exemplary embodiment for the sequence generator 600'. In the example of FIG. 12(d), the sequence generator 600' comprises any of the embodiments for sequence generator 600 as described in connection with FIGS. 9 and 10(a)-(c). The sequence generator 600 will receive as an input either the data tag 502 or the feedback ciphertext i, as defined by control logic. The control logic is preferably configured to pass on the feedback ciphertext to seed the sequence generator 600 only when the conditions for the feedback stride i are met. As an example, such control can be achieved with a multiplexer 1262 whose inputs are either the data tag 502 or the feedback ciphertext i. A counter-based control circuit 1260 can define which of the inputs to multiplexer 1262 are passed to the sequence generator 600 such that the feedback ciphertext i is only passed on when it is time to use the ciphertext to further randomize the bit vectors.

As another embodiment of the present invention, the inventors disclose a symmetrical embodiment for encryption/decryption. With "symmetrical" encryption/decryption, the same order of operations can be performed on data blocks to both encrypt and decrypt those data blocks. Thus, with a symmetrical embodiment, the same module that is used to encrypt data can be used to decrypt encrypted data. FIGS. 13(a) and (b) illustrate a symmetrical embodiment of the present invention. As can be seen, the same order of operations is used by FIG. 13(a) to encrypt a data block as is used by FIG. 13(b) to decrypt a ciphertext data block. The symmetrical encryption/decryption engine 1300 comprises a first reversible combinatorial stage 210, a block cipher operation stage 100, and a second reversible combinatorial stage 1302. A bit vector generation stage 504 (such as the sequence generators 600 shown in FIG. 9 and FIGS. 10(a)-(c)) operates to produce blockwise independent bit vectors 506 that are fed to both the first reversible combinatorial stage 210 and the second reversible combinatorial stage 1302.

As shown in FIG. 13(a), for encryption, a plaintext data block is reversibly combined with a blockwise independent bit vector 506 by first reversible combinatorial operation stage 210 (preferably XOR logic), to thereby generate a data block-bit vector combination 508. Block cipher 100 then performs a block cipher operation on this data block-bit vector combination 508 using a key. The resultant block ciphered data block-bit vector combination 1304 is then reversibly combined with a blockwise independent bit vector 506 by second reversible combinatorial operation stage 1302 (preferably XOR logic), to thereby generate a block ciphered data block-bit vector-bit vector combination 1306, which can serve as the ciphertext for the plaintext data block.

For decryption, as shown in FIG. 13(b), the same order of operations is used, albeit starting from a ciphertext data block rather than a plaintext data block. The ciphertext data block used for decryption will be a block ciphered data block-bit vector-bit vector combination 1306 that was produced during the encryption operation. First reversible combinatorial operation stage 210 operates to reversibly combine such a ciphertext data block with the same bit vector 506 that was used by the second reversible combinatorial operation stage 1302 when encrypting that ciphertext data block. The result of this reversible combination will be a reconstruction of the block ciphered data block-bit vector combination 1304. Block cipher 100 then performs a block cipher operation (decryption in this example) using the key to reconstruct the data block-bit vector combination 508. Second reversible combinatorial operation stage 210 then operates to reversibly combine the reconstructed data block-bit vector combination 508 with the same bit vector 506 that was used by the first reversible combinatorial operation stage 210 when encrypting that ciphertext data block. The output of the second reversible combinatorial operation stage 1302 then serves as a reconstruction of the plaintext data block.

Timing logic (not shown) can be employed to synchronize the outputs of bit vectors 506 from the bit vector generation stage 504 such that the appropriate bit vector 506 is fed to the second reversible combinatorial stage 1302 for each block ciphered data block-bit vector combination 1304 (or reconstructed data block-bit vector combination 508 for the decryption mode) that is processed thereby. Such synchronization could be designed to accommodate the latency within the block cipher 100 to thereby allow the same bit vector 506 to be used for reversible combination with a given data block by first reversible combinatorial operation stage 210 as is used for later reversible combination with the block ciphered data block-bit vector combination 1304 derived from that given data block by the second reversible combinatorial operation stage 1302.

FIG. 14(a) (for encryption mode) and FIG. 14(b) (for decryption mode) depict an example of the symmetrical embodiment of FIGS. 13(a) and (b), wherein the bit vectors 506 are derived from the LBA for the data segment 400.

Figure 15A:
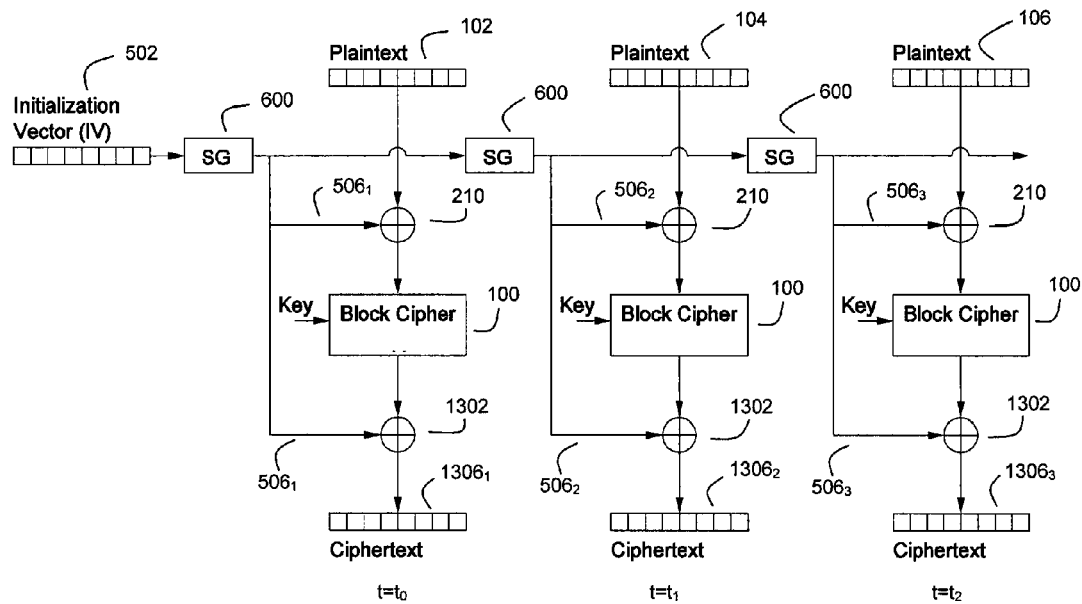
FIGS. 15(a) and (b) depict the embodiment of FIGS. 14(a) and (b) showing its operation over time.
Figure 15B:
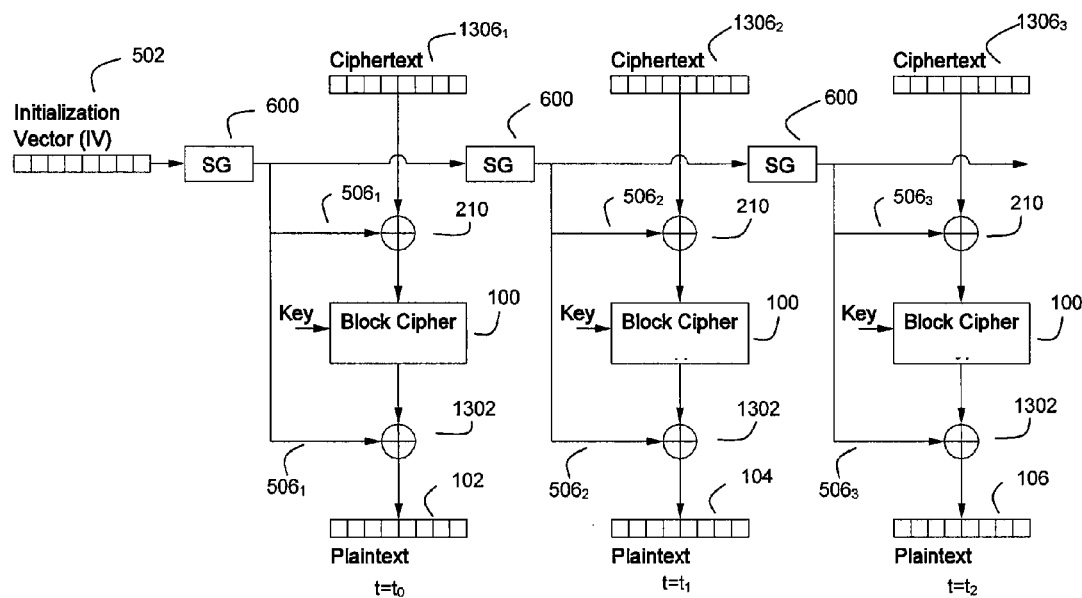
FIGS. 15(c) and (d) depict a symmetrical encryption/decryption counterpart to the embodiments of FIGS. 12(a) and (b)

FIG. 15(a) (for encryption mode) and FIG. 15(b) (for decryption mode) depict the operation of the embodiment of FIGS. 14(a) and (b) over time.

It should also be noted that the symmetrical encryption/decryption embodiments described herein can also be used in a hybrid CBC embodiment like the ones shown in FIGS. 12(a) and (b). An example of such a symmetrical hybrid embodiment is shown in FIGS. 15(c) and (d), wherein the feedback link 1502 carries the block ciphered data block-bit vector-bit vector output 1306 of the second reversible combinatorial operation stage 1302 performed for the first data block. The sequence generators 600' as shown in FIGS. 12(c) and (d) can be employed, although the feedback ciphertext will preferably emanate from the output of the second reversible combinatorial operator 1302 rather than the output of the block cipher 100.

Figure 16:
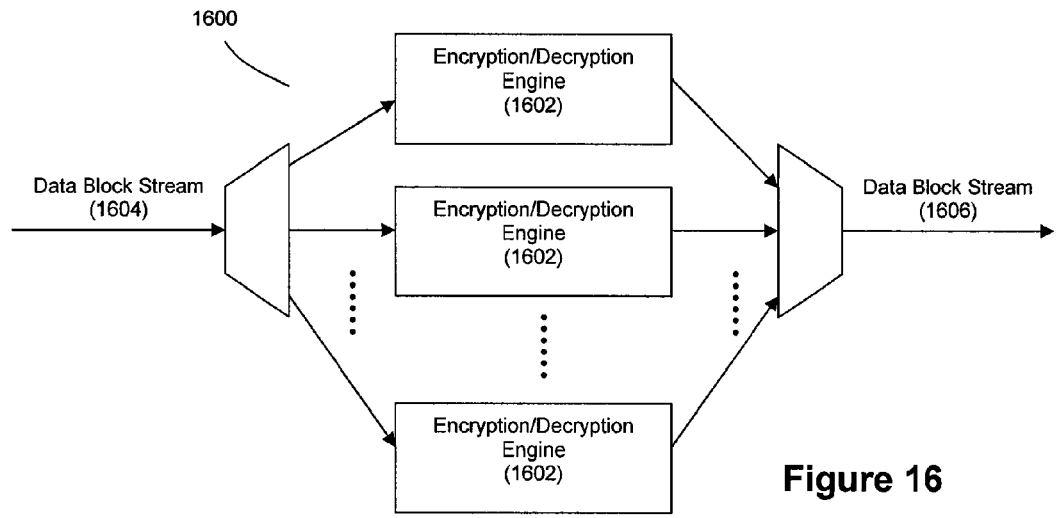
FIG. 16 depicts a parallel architecture for encrypting or decrypting data blocks.

As a further embodiment of the present invention, the inventors note that a parallel architecture 1600 such as the one shown in FIG. 16 can be employed. With this parallel architecture, a stream of incoming data blocks 1604 (which can be either plaintext data blocks or ciphertext data blocks) are separated into a plurality of parallel streams for processing by parallel encryption/decryption engines 1602. Such encryption/decryption engines can take the form of any of the embodiments of the invention described herein such as those shown in connection with FIGS. 5(a) and (b), 7(a) and (b), 11, 12(a) and (b), 13(a) and (b), and 14(a) and (b). The resultant data streams produced by each parallel encryption/decryption engine 1602 can then be brought together to form the outgoing data stream 1606 (which may be either plaintext data blocks or ciphertext data blocks depending on whether the encryption/decryption engines 1602 performed encryption or decryption). It is also worth noting that each parallel engine 1602 can employ its own bit vector generation stage 504, or the same bit vector generation stage 504 can be shared by multiple (or all) of the parallel encryption engines 1602.

The encryption/decryption techniques of the present invention can be implemented in a variety of ways including but not limited to a software implementation on any programmable processor (such as general purpose processors, embedded processors, network processors, etc.), a hardware implementation on devices such as programmable logic devices (e.g., field programmable gate arrays (FPGAs)), ASICs, and a hardware and/or software implementation on devices such as chip multi-processors (CMPs), etc. For example, some CMPs include built-in hardware for encryption ciphers, in which case software on parallel processors systems for the CMPs could perform the bit vector generation and reversible combinatorial tasks while offloading the block cipher operations to the dedicated hardware.

However, the inventors herein particularly note that the present invention is highly amenable to implementation in reconfigurable logic such as an FPGA. Examples of suitable FPGA platforms for the present invention are those described in the following: U.S. patent application Ser. No. 11/339,892 (filed Jan. 26, 2006, entitled "Firmware Socket Module for FPGA-Based Pipeline Processing" and published as 2007/0174841), published PCT applications WO 05/048134 and WO 05/026925 (both filed May 21, 2004 and entitled "Intelligent Data Storage and Processing Using FPGA Devices"), pending U.S. patent application Ser. No. 10/153,151 (filed May 21, 2002 entitled "Associative Database Scanning and Information Retrieval using FPGA Devices", published as 2003/0018630, now U.S. Pat. No. 7,139,743), and U.S. Pat. No. 6,711,558 (entitled "Associative Database Scanning and Information Retrieval"), the entire disclosures of each of which are incorporated by reference herein.

Figure 17A:
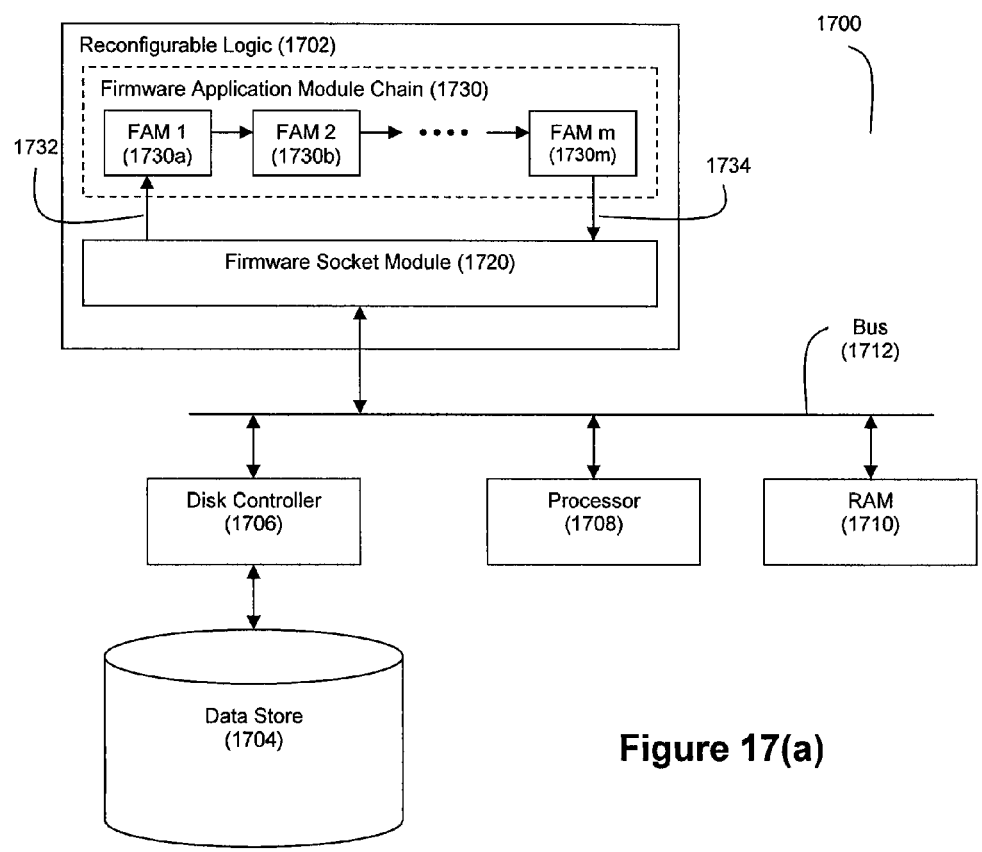
FIGS. 17(a) and (b) depict exemplary hardware environments for the present invention.

FIG. 17(a) depicts an example of an implementation environment for the present invention. FIG. 17(a) depicts a system 1700 comprising a host processor 1708 and host RAM 1710 in communication with a disk controller 1706 via bus 1712. Disk controller 1706 governs access to data store 1704 which may be any device capable of storing data. In an exemplary embodiment, data store 1704 is a mass storage medium such as a RAID system or subsystem. In such an instance, disk controller 1706 is a RAID controller.

Data flowing to or from data store 1704 can be routed through reconfigurable logic device 1702 (which may be embodied by an FPGA). One or more firmware application modules (FAMs) 1730 are deployed on the reconfigurable logic using the techniques described in the above-incorporated references. The different stages of the encryption/decryption engine of the present invention can be implemented on the reconfigurable logic device 1702 as a processing pipeline deployed on one or more of these FAMs 1730. Firmware socket module 1720 can be implemented as described in the incorporated Ser. No. 11/339,892 patent application to control the flow of data to and from the encryption/decryption engine(s) deployed on the reconfigurable logic device 1702 via communication paths 1732 and 1734. Data to be encrypted and stored in the data store can be routed through the reconfigurable logic device 1702 along with appropriate control instructions for the encryption. Such control information can include the data tag used to generate the blockwise independent bit vectors. Moreover, these control instructions can emanate from any source with access to system bus 1712 including sources that connect to the system bus 1712 over a network. For example, in an embodiment wherein the data segment's LBA is used as the data tag from which the bit vectors are generated, the LBA can be passed to the FAM pipeline 1730 with the data from the data store 1704 or it can be passed to the FAM pipeline 1730 from processor 1708. Moreover, the data segments to be encrypted can emanate from any source with access to the reconfigurable logic device 1702. Encrypted data to be decrypted can also be routed through the reconfigurable logic device 1702 along with appropriate control instructions for the decryption.

Thus, when encrypting a data segment to be stored at an LBA of the data store 1704, the data blocks of the data segment can be streamed through a FAM 1730 on reconfigurable logic device 1702 that is configured to perform encryption in accordance with the teachings of the present invention (with the encryption FAM 1730 preferably deriving the blockwise independent bit vectors 506 from the LBA). The resultant ciphertext produced by the encryption FAM 1730 can then be stored in data store 1704 starting at the LBA. On decryption, the ciphertext data blocks of the encrypted data segment (or a subset thereof) can be streamed through a decryption FAM 1730 (or a symmetrical encryption/decryption FAM 1730) to reconstruct the plaintext data segment (or subset thereof). Once again, in an embodiment wherein the blockwise independent bit vectors are derived form the data segment's LBA, the LBA can also be used as the source of the bit vectors used during the decryption process.

It should also be noted that for disk or file encryption operations, it may be desirable to include the platform (e.g., FPGA or ASIC) on which the encryption/decryption engine of the present invention is deployed (or the encryption/decryption engine itself) on-board the disk controller 1706. It may also be desirable for the encryption/decryption engine to receive all data streaming to/from the disk(s), in which case control information could be added to the data streams to inform the encryption/decryption engine of which data is to be encrypted/decrypted and which data is to be passed through without modification. For example, such control information can take the form of a flag within a data set's SCSI control block (SCB).

Figure 17B:
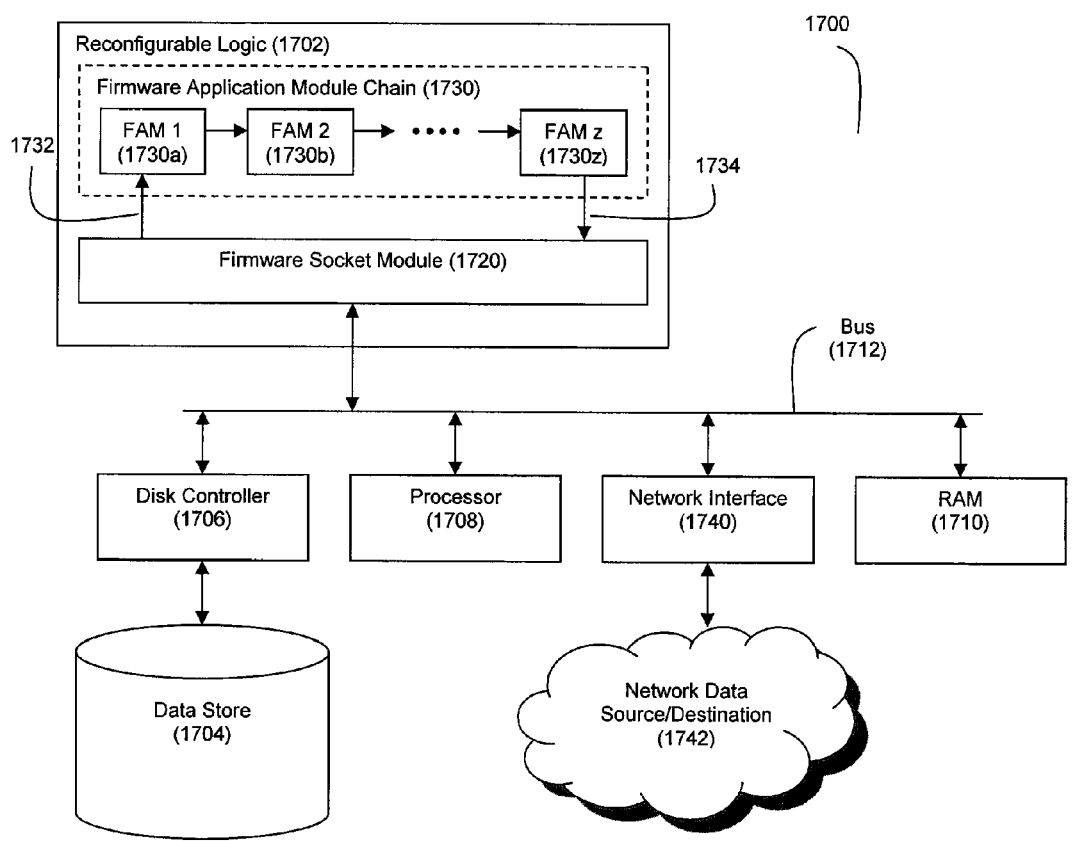

The embodiment of FIG. 17(b) depicts the system 1700 wherein bus 1712 is also connected to a network 1742 through network interface 1740. Such a network 1742 can also serve as a source or destination for data to be encrypted or decrypted (e.g., network data traffic such as network data packets that may need encryption/decryption). It should also be noted that system 1700 can be configured such that bus 1712 connects to a network 1742 (through network interface 1742) but not to a data store 1704 (through disk controller 1706) if desired by a practitioner of the present invention in view of the use(s) to which the practitioner intends to put the invention.

Figure 18A:
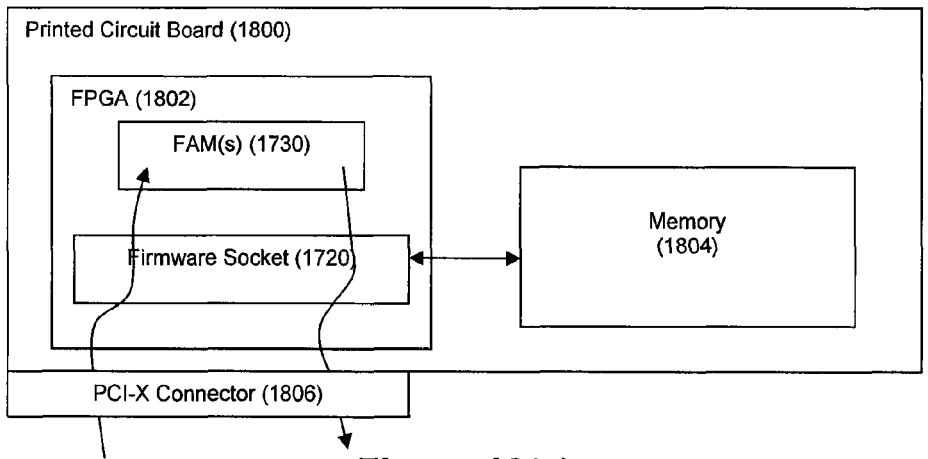
FIGS. 18(a)-(c) depict exemplary printed circuit boards on which the encryption/decryption embodiments of the present invention can be deployed.

FIG. 18(a) depicts a printed circuit board or card 1800 that can be connected to the PCI-X bus 1712 of a computer system (e.g., a commodity computer system or other) for use in encrypting/decrypting data. In the example of FIG. 18(a), the printed circuit board includes an FPGA chip 1802 (such as a Xilinx Virtex 4 FPGA) that is in communication with a memory device 1804 and a PCI-X bus connector 1806. A preferred memory device 1804 comprises SRAM and DRAM memory. A preferred PCI-X bus connector 1806 is a standard card edge connector.

Figure 18B:
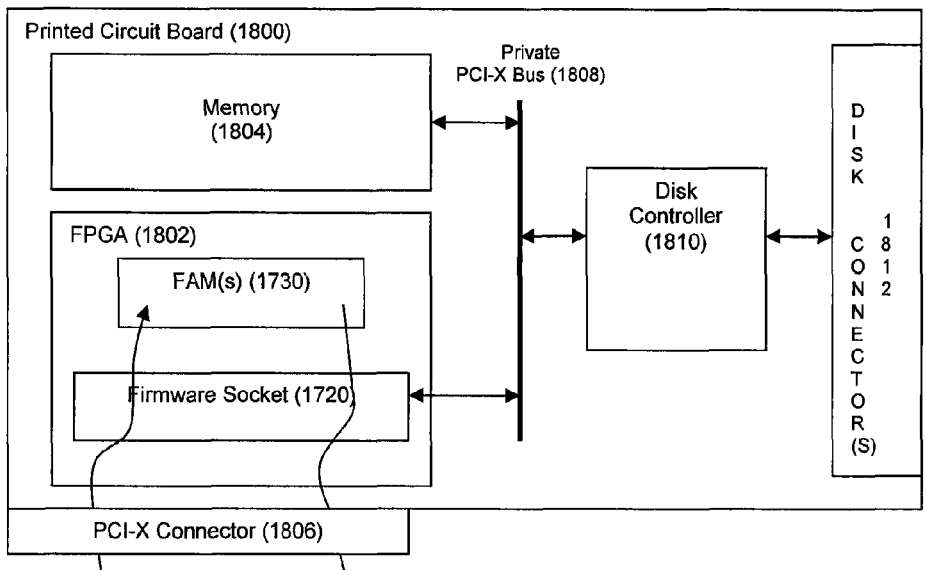

FIG. 18(b) depicts an alternate configuration for a printed circuit board/card 1800. In the example of FIG. 18(b), a private bus 1808 (such as a PCI-X bus), a disk controller 1810, and a disk connector 1812 are also installed on the printed circuit board 1800. Any commodity disk interface technology can be supported, as is understood in the art. In this configuration, the firmware socket 1720 also serves as a PCI-X to PCI-X bridge to provide the processor 1708 with normal access to the disk(s) connected via the private PCI-X bus 1808.

Figure 18C:
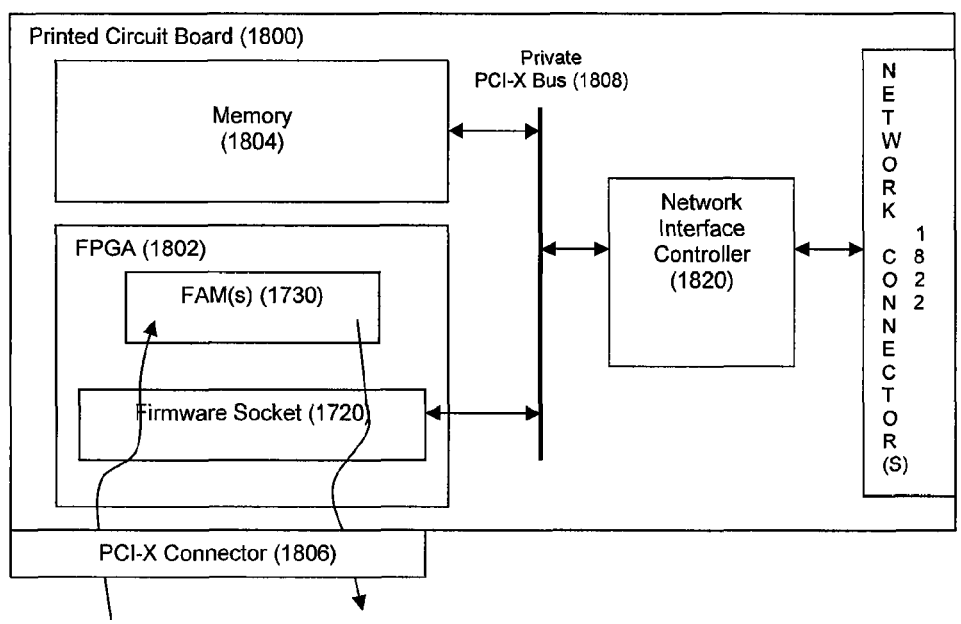

FIG. 18(c) depicts another alternate configuration for a printed circuit board/card 1800. In the example of FIG. 18(b), a private bus 1808 (such as a PCI-X bus), a network interface controller 1820, and a network connector 1822 are also installed on the printed circuit board 1800. Any commodity network interface technology can be supported, as is understood in the art. In this configuration, the firmware socket 1720 also serves as a PCI-X to PCI-X bridge to provide the processor 1708 with normal access to the network(s) connected via the private PCI-X bus 1808.

It should be further noted that the printed circuit board/card 1800 may also be configured to support both a disk controller/connector 1810/1812 and a network interface controller/connector 1820/1822 to connect the board 1800 to disk(s) and network(s) via private PCI-X bus 1808, if desired by a practitioner of the invention.

It is worth noting that in either of the configurations of FIGS. 18(a)-(c), the firmware socket 1720 can make memory 1804 accessible to the PCI-X bus, which thereby makes memory 1804 available for use by an OS kernel for the computer system as the buffers for transfers from the disk controller and/or network interface controller to the FAMs. It is also worth noting that while a single FPGA chip 1802 is shown on the printed circuit boards of FIGS. 18(a)-(c), it should be understood that multiple FPGAs can be supported by either including more than one FPGA on the printed circuit board 1800 or by installing more than one printed circuit board 1800 in the computer system. Further still, it should be noted that the printed circuit boards 1800 of the embodiments of FIGS. 18(a)-(c) can use an ASIC chip on which the encryption/decryption engines are deployed rather than an FPGA chip 1802. if desired by a practitioner of the invention.

Exemplary applications for the present invention include but are not limited to general purpose data encryption (e.g., files, images, documents, etc.), disk encryption, streaming message (e.g., packets, cells, etc.) encryption, and streaming image encryption (e.g., streaming reconnaissance imagery, etc.).

While the present invention has been described above in relation to its preferred embodiment, various modifications may be made thereto that still fall within the invention's scope. Such modifications to the invention will be recognizable upon review of the teachings herein. As such, the full scope of the present invention is to be defined solely by the appended claims and their legal equivalents.

What is claimed is:

1. A method of encrypting a data segment, the data segment comprising a plurality of data blocks, each data block comprising a plurality of data bits, the method comprising:

encrypting a first plurality of data blocks of the data segment by (1) generating a first plurality of bit vectors, (2) reversibly combining each of the first plurality of data blocks with a corresponding one of the first plurality of bit vectors to thereby generate a first plurality of data block-bit vector combinations, and (3) performing an encryption operation on the first plurality of data block-bit vector combinations, wherein the first plurality of bit vectors have values that are independent of the encryption operations performed on the first plurality of data blocks; and encrypting a second plurality of data blocks of the data segment by (1) generating a second plurality of bit vectors based at least in part upon a value of one of the first plurality of encrypted data block-bit vector combinations, (2) reversibly combining each of the second plurality of data blocks with a corresponding one of the second plurality of bit vectors to thereby generate a second plurality of data block-bit vector combinations, and (3) performing an encryption operation on the second plurality of data block-bit vector combinations; and wherein the method steps are performed by a circuit, wherein the circuit comprises a block cipher circuit and a sequence generator circuit, the block cipher circuit comprising a plurality m of pipelined stages, the block cipher circuit pipelined stages simultaneously performing, in a pipelined fashion, a portion of the encrypting steps on a plurality m of different data block-bit vector combinations corresponding to m data blocks of the data segment, the sequence generator circuit performing the steps of generating the first and second plurality of bit vectors, the sequence generator circuit comprising counter control logic, the method further comprising the counter control logic (1) generating a count value indicative of how many data blocks of the same data segment have been processed by the block cipher circuit, (2) determining whether a condition corresponding to a feedback stride has been met such that the counter control logic determines that the feedback stride condition has been met in response to at least m data blocks of the same data segment having been processed by the block cipher circuit, (3) in response to a determination that the condition corresponding to the feedback stride has not been met, selectively controlling the generating step to generate the first plurality of bit vectors, and (4) in response to a determination that the condition corresponding to the feedback stride has been met, selectively controlling the generating step to generate the second plurality of bit vectors.

2. The method of claim 1 wherein the step of generating the first plurality of bit vectors comprises generating the first plurality of bit vectors based at least in part upon a data tag associated with the data segment.

3. The method of claim 2 wherein the step of generating the first plurality of bit vectors further comprises randomizing the values of the first plurality of bit vectors.

4. The method of claim 1 wherein the steps of generating the first and second plurality of bit vectors comprise:
the sequence generator circuit (1) receiving a data tag associated with the data segment, (2) generating a randomized bit vector based on the received data tag, (3) receiving feedback data corresponding to the value of one of the first plurality of encrypted data block-bit vector combinations, (4) selecting as between null data and the feedback data based on the determining step such that the null data is selected in response to a determination that the condition corresponding to the feedback stride has not been met and the feedback data is selected in response to a determination that the condition corresponding to the feedback stride has been met, and (5) combining the generated randomized bit vector with the selected data to thereby generate an output bit vector for subsequent reversible combination with a data block during the encryption operation.

5. The method of claim 4 wherein the combining step comprises the sequence generator circuit reversibly combining the generated randomized bit vector with the selected data to thereby generate the output bit vector for subsequent reversible combination with a data block during the encryption operation.

6. The method of claim 1 wherein the steps of generating the first and second plurality of bit vectors comprise:

the sequence generator circuit (1) receiving a data tag associated with the data segment, (2) receiving feedback data corresponding to the value of one of the first plurality of encrypted data block-bit vector combinations, (3) selecting as between the data tag and the feedback data based on the determining step such that the data tag is selected in response to a determination that the condition corresponding to the feedback stride has not been met and the feedback data is selected in response to a determination that the condition corresponding to the feedback stride has been met, and (4) generating a randomized bit vector based on the selected data as an output bit vector for subsequent reversible combination with a data block during the encryption operation.

7. The method of claim 1 further comprising performing the method steps in parallel via a plurality of parallel block cipher circuits and sequence generator circuits.

8. The method of claim 1 wherein the encrypting steps comprise symmetrically encrypting the first and second plurality of data blocks by reversibly combining each of the first and second plurality of encrypted data block bit-vector combinations with the corresponding bit vectors reversibly combined with the data blocks corresponding thereto.

9. The method of claim 1 wherein the circuit comprises a programmable processor for performing the method steps in response to executing software.

10. The method of claim 9 wherein the programmable processor comprises a plurality of general purpose processors for performing the method steps in response to executing software.

11. The method of claim 1 wherein the circuit comprises a reconfigurable logic device for performing the method steps.

12. The method of claim 11 wherein the reconfigurable logic device comprises a field programmable gate array (FPGA) for performing the method steps.

13. The method of claim 1 wherein the circuit comprises a chip multi-processor (CMP) for performing the method steps.

14. The method of claim 1 wherein the circuit comprises an application-specific integrated circuit (ASIC) for performing the method steps.

15. A method of encrypting a data segment, said data segment comprising a plurality of data block groups, each of said data block groups comprising a plurality of data blocks, the method comprising:
a sequence generator circuit creating a first plurality of bit vectors, wherein the bit vectors of the first plurality of bit vectors comprise blockwise independent bit vectors, the sequence generator circuit comprising counter control logic;
a block cipher circuit encrypting the data blocks of a first data block group based at least in part upon the first plurality of bit vectors that are combined with the data blocks of the first data block group, the block cipher circuit comprising a plurality m of pipelined stages, the block cipher circuit pipelined stages simultaneously performing, in a pipelined fashion, a portion of the first data block group encrypting step on a plurality m of different data blocks corresponding to the data blocks of the first data group;
the sequence generator circuit creating a second plurality of bit vectors based at least at part on one of the previously encrypted data blocks;
the block cipher circuit encrypting the data blocks of a data block group after the first data block group based at least in part upon the second plurality of bit vectors that are combined with the data blocks of the data block group after the first data block group, the data block groups belonging to the same data segment, and the block cipher circuit pipelined stages simultaneously performing, in a pipelined fashion, a portion of the second data block group encrypting step on a plurality m of different data blocks corresponding to m data blocks of the second data block group; and the counter control logic (1) generating a count value indicative of how many data blocks of the same data block group have been processed by the block cipher circuit, (2) determining whether a condition corresponding to a feedback stride has been met such that the counter control logic determines that the feedback stride condition has been met in response to at least m data blocks of the first data block group having been processed by the block cipher circuit, (3) in response to a determination that the condition corresponding to the feedback stride has not been met, selectively controlling the sequence generator to create the first plurality of bit vectors, and (4) in response to a determination that the condition corresponding to the feedback stride has been met, selectively controlling the sequence generator to create the second plurality of bit vectors.

16. The method of claim 15 wherein the steps of creating the first and second plurality of bit vectors comprise:

the sequence generator circuit (1) receiving a data tag associated with the data segment, (2) generating a randomized bit vector based on the received data tag, (3) receiving feedback data corresponding to a previously encrypted data block, (4) selecting as between null data and the feedback data based on the determining step such that the null data is selected in response to a determination that the condition corresponding to the feedback stride has not been met and the feedback data is selected in response to a determination that the condition corresponding to the feedback stride has been met, and (5) combining the generated randomized bit vector with the selected data to thereby generate an output bit vector for subsequent reversible combination with a data block during the encrypting steps.

17. The method of claim 16 wherein the combining step comprises the sequence generator circuit reversibly combining the generated independent bit vector with the selected data to thereby generate the output bit vector for subsequent reversible combination with a data block during the encrypting steps.

18. The method of claim 15 wherein the steps of creating the first and second plurality of bit vectors comprise:

the sequence generator circuit (1) receiving a data tag associated with the data segment, (2) receiving feedback data corresponding to a previously encrypted data block, (3) selecting as between the data tag and the feedback data based on the determining step such that the data tag is selected in response to a determination that the condition corresponding to the feedback stride has not been met and the feedback data is selected in response to a determination that the condition corresponding to the feedback stride has been met, and (4) generating a randomized bit vector based on the selected data as an output bit vector for subsequent reversible combination with a data block during the encrypting steps.

19. The method of claim 15 further comprising performing the method steps in parallel via a plurality of parallel block cipher circuits and sequence generator circuits.

20. The method of claim 15 wherein the encrypting steps comprise symmetrically encrypting the data blocks of the first data block group and the data blocks of the data block group after the first data block group by reversibly combining each of the encrypted data blocks with the corresponding bit vectors combined with the data blocks corresponding thereto.

21. The method of claim 15 wherein the circuit comprises a programmable processor for performing the method steps in response to executing software.

22. The method of claim 21 wherein the programmable processor comprises a plurality of general purpose processors for performing the method steps in response to executing software.

23. The method of claim 15 wherein the circuit comprises a reconfigurable logic device for performing the method steps.

24. The method of claim 23 wherein the reconfigurable logic device comprises a field programmable gate array (FPGA) for performing the method steps.

25. The method of claim 15 wherein the circuit comprises a chip multi-processor (CMP) for performing the method steps.

26. The method of claim 15 wherein the circuit comprises an application-specific integrated circuit (ASIC) for performing the method steps.

27. A system for encrypting a plurality of data block groups, at least some of said data block groups comprising a plurality of data blocks, said system comprising:

an encryptor circuit; and a sequence generator circuit configured to generate at least two types of bit vectors for use by the encryptor circuit, a first type of bit vector being blockwise independent and a second type of bit vector being dependent on at least one encrypted data block of a prior data block group;

wherein the encryptor circuit is configured to reversibly combine the data blocks of at least two of the data block groups with a plurality of bit vectors generated by the sequence generator to thereby generate a plurality of data block-bit vector combinations;

wherein the encryptor circuit comprises a block cipher circuit for encrypting the data block-bit vector combinations, the block cipher circuit comprising a plurality m of pipelined stages for simultaneously processing, in a pipelined fashion, a plurality m of different data block-bit vector combinations corresponding to m data blocks of the data block groups; wherein the sequence generator circuit comprises counter control logic, the counter control logic configured to (1) generate a count value indicative of how many data block-bit vector combinations corresponding to data blocks belonging to the same data block group have been processed by the block cipher circuit, (2) determine whether a condition corresponding to a feedback stride has been met in response to the count value indicating that at least m data block-bit vector combinations corresponding to m data blocks belonging to the same data block group have been processed by the block cipher circuit, (3) in response to a determination that the feedback stride condition has not been met, selectively control the sequence generator circuit to output a bit vector of the first type, and (4) in response to a determination that the feedback stride condition has been met, selectively control the sequence generator circuit to output a bit vector of the second type.

28. The system of claim 27 wherein the sequence generator circuit further comprises a multiplexer, a bit vector sequence generator circuit, and a combiner circuit;

wherein the multiplexer is configured to receive as inputs null data and the at least one encrypted data block of a prior data block group;

wherein the counter control logic is configured to control the multiplexer to select which of the inputs is passed as an output based on the determination operation such that the null data is selected in response to a determination that the condition corresponding to the feedback stride has not been met and the at least one encrypted data block of a prior data block group is selected in response to a determination that the condition corresponding to the feedback stride has been met;

wherein the bit vector sequence generator circuit is configured to (1) receive a data tag associated with the data segment, and (2) generate a randomized bit vector based on the received data tag; and wherein the combiner circuit is configured to combine the output from the multiplexer with the randomized bit vector generated by the bit vector sequence generator circuit to thereby generate an output bit vector for delivery to the encryptor circuit for subsequent reversible combination with a data block by the encryptor circuit.

29. The system of claim 28 wherein the combiner circuit is configured to reversibly combine the output from the multiplexer with the randomized bit vector generated by the bit vector sequence generator circuit to thereby generate the output bit vector for delivery to the encryptor circuit for subsequent reversible combination with a data block by the encryptor circuit.

30. The system of claim 27 wherein the data block groups are members of a data segment, and wherein the sequence generator circuit further comprises a multiplexer and a bit vector sequence generator circuit;

wherein the multiplexer is configured to receive as inputs a data tag associated with the data segment and the at least one encrypted data block of a prior data block group;

wherein the counter control logic is configured to control the multiplexer to select which of the inputs is passed as an output based on the determination operation such that the data tag is selected in response to a determination that the condition corresponding to the feedback stride has not been met and the at least one encrypted data block of a prior data block group is selected in response to a determination that the condition corresponding to the feedback stride has been met;

wherein the bit vector sequence generator circuit is configured to generate a randomized bit vector based on the output from the multiplexer to thereby generate an output bit vector for delivery to the encryptor circuit for subsequent reversible combination with a data block by the encryptor circuit.

31. The system of claim 27 further comprising a plurality of the encryptor circuits in parallel and a circuit upstream from the parallel encryptor circuits, the upstream circuit configured to receive a stream comprising a plurality of the data block groups and distribute the data block groups to the parallel encryptor circuits for parallel processing thereby.

32. The system of claim 27 wherein the encryptor circuit comprises a symmetric encryptor circuit.

33. The system of claim 27 wherein the encryptor circuit and the sequence generator circuit are implemented on a programmable processor.

34. The system of claim 33 wherein the programmable processor comprises a plurality of general purpose processors.

35. The system of claim 27 wherein the encryptor circuit and the sequence generator circuit are implemented on a reconfigurable logic device.

36. The system of claim 35 wherein the reconfigurable logic device comprises a field programmable gate array (FPGA).

37. The system of claim 27 wherein the encryptor circuit and the sequence generator circuit are implemented on a chip multi-processor (CMP).

38. The system of claim 27 wherein the encryptor circuit and the sequence generator circuit are implemented on an application-specific integrated circuit (ASIC).

39. An apparatus comprising:
an encryption circuit for encrypting a plurality of data blocks of a data segment, the encryption circuit comprising a combiner circuit, a block cipher circuit, and a sequence generator circuit;

wherein, for each of the data blocks of the data segment,
the sequence generator circuit is configured to generate a bit vector for delivery to the combiner circuit;
the combiner circuit is configured to (1) receive the bit vector generated by the sequence generator circuit for delivery thereto, and (2) reversibly combine the received bit vector with a data block of the data segment to thereby generate a bit vector-data block combination;
the block cipher circuit comprising a plurality m of pipelined stages for simultaneously processing, in a pipelined fashion, a plurality m of different bit vector-data block combinations corresponding to m data blocks of the data segment that are generated by the combiner circuit to thereby generate a plurality of encrypted data blocks; and
the sequence generator circuit is further configured to (1) receive a feedback input of an encrypted data block from the block cipher circuit, (2) track a configurable feedback stride condition as the plurality of data blocks are processed by the encryption circuit by generating a count value such that the sequence generator circuit determines that the feedback stride condition has been met in response to at least m data blocks of the same data segment having been processed by the block cipher circuit, (3) selectively control the generation of the bit vector in response to the feedback stride condition being met such that the generated bit vector for delivery to the combiner circuit comprises a blockwise dependent bit vector based on the feedback input, and (4) selectively control the generation of the bit vector in response to the feedback stride condition not being met such that the generated bit vector for delivery to the combiner circuit comprises a blockwise independent bit vector, the sequence generator circuit thereby being configured to generate a plurality of the blockwise dependent bit vectors and a plurality of the blockwise independent bit vectors for combination with a plurality of the data blocks of the same data segment prior to encryption by the block cipher circuit.

40. The apparatus of claim 39 wherein the combiner circuit comprises a first combiner circuit, wherein the sequence generator circuit comprises a multiplexer, counter control logic, a bit vector sequence generator circuit, and a second combiner circuit;

the multiplexer configured to receive as inputs null data and the feedback input;

the counter control logic configured to (1) determine whether the feedback stride condition has been met based at least in part on the count value, (2) in response to a determination that the feedback stride condition has not been met, control the multiplexer to pass the null data as an output, and (3) in response to a determination that the feedback stride condition has been met, control the multiplexer to pass the feedback input as an output;
the bit vector sequence generator circuit configured to (1) receive a data tag associated with the data segment, and (2) generate a randomized bit vector based on the received data tag; and
the second combiner circuit is configured to combine the output from the multiplexer with the randomized bit vector generated by the bit vector sequence generator circuit to thereby generate the bit vector for delivery to the first combiner circuit.

41. The apparatus of claim 40 wherein the second combiner circuit is configured to reversibly combine the output from the multiplexer with the randomized bit vector generated by the bit vector sequence generator circuit to thereby generate the bit vector for delivery to the first combiner circuit.

42. The apparatus of claim 39 wherein the sequence generator circuit comprises a multiplexer, counter control logic, and a bit vector sequence generator circuit;
the multiplexer configured to receive as inputs a data tag associated with the data segment and the feedback input;
the counter control logic configured to (1) determine whether the feedback stride condition has been met based at least in part on the count value, (2) in response to a determination that the feedback stride condition has not been met, control the multiplexer to pass the data tag as an output, and (3) in response to a determination that the feedback stride condition has been met, control the multiplexer to pass the feedback input as an output;
the bit vector sequence generator circuit configured to (1) receive the output from the multiplexer, and (2) generate a randomized bit vector based on the received output from the multiplexer to thereby generate the bit vector for delivery to the combiner circuit.

43. The apparatus of claim 39 further comprising a plurality of the encryption circuits in parallel and a circuit upstream from the parallel encryption circuits, the upstream circuit configured to receive a stream comprising a plurality of data blocks and distribute the data blocks to the parallel encryptor circuits for parallel processing thereby such that each parallel encryption circuit receives a plurality of data blocks of the same data segment.

44. The apparatus of claim 39 wherein the combiner circuit comprises a first combiner circuit, the encryption circuit further comprising a second combiner circuit for reversibly combining the encrypted data block generated by the block cipher circuit with the generated bit vector to thereby render the encryption circuit a symmetric encryption circuit.

45. The apparatus of claim 39 wherein the combiner circuit, the block cipher circuit, and the sequence generator circuit are implemented on a programmable processor.

46. The apparatus of claim 45 wherein the programmable processor comprises a plurality of general purpose processors.

47. The apparatus of claim 39 wherein the combiner circuit, the block cipher circuit, and the sequence generator circuit are implemented on a reconfigurable logic device.

48. The apparatus of claim 47 wherein the reconfigurable logic device comprises a field programmable gate array (FPGA).

49. The apparatus of claim 39 wherein the combiner circuit, the block cipher circuit, and the sequence generator circuit are implemented on a chip multi-processor (CMP).

50. The apparatus of claim 39 wherein the combiner circuit, the block cipher circuit, and the sequence generator circuit are implemented on an application-specific integrated circuit (ASIC).

51. An apparatus comprising:
an encryption circuit for encrypting a plurality of data blocks of a data segment, the encryption circuit comprising a combiner circuit, a block cipher circuit, and a sequence generator circuit;
the block cipher circuit comprising a plurality m of pipelined stages for simultaneously processing, in a pipelined fashion, a plurality m of different bit vector-data block combinations corresponding to m data blocks of the data segment that are generated by the combiner circuit to thereby generate a plurality of encrypted data blocks; and
the sequence generator configured to selectively switch between a blockwise independent randomized (BIR) mode and a cipher block chaining (CBC) mode based on a configurable feedback stride condition, the configurable feedback stride condition corresponding to the block cipher circuit completing encryption of at least the bit vector-data block combination corresponding to the first of the m data blocks, wherein the sequence generator circuit comprises counter control logic configured to track when the feedback stride condition is met, and wherein the sequence generator is further configured to (1) generate and output a plurality of randomized blockwise independent bit vectors while in the BIR mode, and (2) generate and output a plurality of blockwise dependent bit vectors while in the CBC mode, the blockwise dependent bit vectors being based on a previously encrypted bit vector-data block combination fed back from the block cipher circuit;
the combiner circuit being configured to (1) receive a streaming input of the data blocks, (2) receive an input of the bit vectors output by the sequence generator circuit, and (3) reversibly combine the received bit vectors with the received streaming data blocks to generate a plurality of bit vector-data block combinations for delivery to the block cipher circuit; and
wherein the sequence generator is further configured to (1) operate in the BIR mode while the block cipher circuit is processing the bit vector-data block combinations corresponding to the first m data blocks of the same data segment, and (2) switch to the CBC mode in response to the feedback stride condition being met, the block cipher circuit thereby being configured to generate the plurality of encrypted data blocks wherein at least the first m encrypted data blocks of the same data segment are encrypted in combination with blockwise independent bit vectors and wherein a plurality of the other encrypted data blocks of the same data segment are encrypted in combination with blockwise dependent bit vectors.

52. The apparatus of claim 51 wherein the encryption circuit is implemented on a programmable processor.

53. The apparatus of claim 52 wherein the programmable processor comprises a plurality of general purpose processors.

54. The apparatus of claim 51 wherein the encryption circuit is implemented on a reconfigurable logic device.

55. The apparatus of claim 54 wherein the reconfigurable logic device comprises a field programmable gate array (FPGA).

56. The apparatus of claim 51 wherein the encryption circuit is implemented on a chip multi-processor (CMP).

57. The apparatus of claim 51 wherein the encryption circuit is implemented on an application-specific integrated circuit (ASIC).

* * * * *